US007519596B2

(12) United States Patent
Iyer et al.

(10) Patent No.: US 7,519,596 B2
(45) Date of Patent: Apr. 14, 2009

(54) GLOBALLY TRUSTED CREDENTIALS LEVERAGED FOR SERVER ACCESS CONTROL

(75) Inventors: Kannan C. Iyer, Sammamish, WA (US); Dmitri Gavrilov, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 398 days.

(21) Appl. No.: 10/906,853

(22) Filed: Mar. 9, 2005

(65) Prior Publication Data

US 2005/0228981 A1    Oct. 13, 2005

Related U.S. Application Data

(60) Provisional application No. 60/558,729, filed on Mar. 30, 2004.

(51) Int. Cl.
*G06F 17/30* (2006.01)
(52) U.S. Cl. .................. 707/9; 707/3; 709/203
(58) Field of Classification Search .......... 707/1–5, 707/9, 10; 709/203; 719/328
See application file for complete search history.

(56) References Cited

U.S. PATENT DOCUMENTS

| | | | | |
|---|---|---|---|---|
| 5,590,199 A * | 12/1996 | Krajewski et al. | ........... | 713/159 |
| 5,689,700 A | 11/1997 | Miller et al. | ........... | 707/10 |
| 5,774,551 A * | 6/1998 | Wu et al. | ........... | 713/155 |
| 5,787,442 A | 7/1998 | Hacherl et al. | ........... | 707/201 |
| 5,832,225 A | 11/1998 | Hacherl et al. | ........... | 709/223 |
| 5,999,711 A | 12/1999 | Misra et al. | ........... | 379/100.19 |
| 6,324,571 B1 | 11/2001 | Hacherl | ........... | 726/2 |
| 6,339,827 B1 | 1/2002 | Stokes et al. | ........... | 713/716 |
| 6,457,011 B1 | 9/2002 | Brace et al. | ........... | 707/10 |
| 6,457,053 B1 | 9/2002 | Satagopan et al. | ........... | 709/226 |
| 6,654,891 B1 | 11/2003 | Borsato et al. | ........... | 726/6 |
| 6,678,731 B1 | 1/2004 | Howard et al. | ........... | 709/226 |
| 6,714,930 B1 | 3/2004 | Garrison et al. | ........... | 707/9 |
| 7,089,584 B1 * | 8/2006 | Sharma | ........... | 726/4 |
| 7,185,359 B2 * | 2/2007 | Schmidt et al. | ........... | 726/2 |
| 7,185,361 B1 * | 2/2007 | Ashoff et al. | ........... | 726/4 |
| 2002/0019857 A1 | 2/2002 | Harjanto | ........... | 709/203 |
| 2002/0095497 A1 | 7/2002 | Satagopan et al. | ........... | 709/219 |
| 2002/0174180 A1 | 11/2002 | Brown et al. | ........... | 709/203 |
| 2002/0194205 A1 | 12/2002 | Brown et al. | ........... | 707/200 |
| 2003/0061483 A1 | 3/2003 | Schell et al. | ........... | 713/166 |

(Continued)

OTHER PUBLICATIONS

Eric Quill, Shawn Dickerson, Novell Virtual Directory Services, Novell Inc., Dec. 8, 2004.

(Continued)

*Primary Examiner*—Cheryl Lewis

(57) ABSTRACT

Systems, methods, computer-readable media and application program interfaces are disclosed for enabling server applications to verify purported authentication information, such as passwords, provided by clients in connection with server access requests by leveraging trusted credentials maintained by separate trusted authorities. In some cases, the server applications may lack trusted credentials that may be used to verify the purported authentication information. In those cases, the server applications may identify security principal accounts managed by the separate trusted authorities for which the provided authentication information may be purported to be valid for by the requesting clients. Further, the server applications may request the separate trusted authorities to authenticate the purported authentication information before granting access to the requesting clients. In other cases, the server applications may maintain locally trusted credentials that may be used to verify the provided authentication information without involving the separate trusted authorities.

20 Claims, 10 Drawing Sheets

U.S. PATENT DOCUMENTS

| | | | |
|---|---|---|---|
| 2003/0174841 A1 | 9/2003 | Nault et al. | 380/277 |
| 2003/0212863 A1 | 11/2003 | Ganguly et al. | 711/118 |
| 2004/0049702 A1 | 3/2004 | Subramaniam et al. | 726/28 |
| 2004/0088431 A1 | 5/2004 | Carter | 709/240 |
| 2004/0168158 A1 | 8/2004 | Jensen et al. | 717/136 |
| 2004/0193459 A1 | 9/2004 | Delaney et al. | 705/7 |
| 2004/0205088 A1 | 10/2004 | Toner | 707/200 |
| 2004/0225669 A1 | 11/2004 | Isaacson et al. | 707/101 |
| 2004/0234253 A1 | 11/2004 | Mahdavi | 386/125 |
| 2004/0240842 A1 | 12/2004 | Mahdavi | 386/46 |
| 2004/0243668 A1 | 12/2004 | Harjanto | 709/225 |
| 2005/0021796 A1 | 1/2005 | McClain et al. | 709/229 |
| 2005/0068983 A1 | 3/2005 | Carter et al. | 370/480 |
| 2005/0071687 A1 | 3/2005 | Pathakis et al. | 726/19 |
| 2005/0097073 A1 | 5/2005 | Mair et al. | 707/1 |
| 2005/0108579 A1 | 5/2005 | Isaacson et al. | 726/19 |
| 2005/0120199 A1 | 6/2005 | Carter | 713/150 |
| 2005/0169173 A1 | 8/2005 | Mandavi | 370/230 |
| 2005/0171872 A1 | 8/2005 | Burch et al. | 705/29 |
| 2005/0172116 A1 | 8/2005 | Burch et al. | 713/155 |

OTHER PUBLICATIONS

Novell. Virtual Directory Services, Technical White Paper. www.novell.com, 2004.

* cited by examiner ns application claims the benefit of U.S. Provisional
GLOBALLY TRUSTED CREDENTIALS LEVERAGED FOR SERVER ACCESS CONTROL

PRIORITY CLAIM

This application claims the benefit of U.S. Provisional Patent Application Ser. No. 60/558,729, filed on Mar. 30, 2004, which is incorporated by reference herein in its entirety.

TECHNICAL FIELD

The technology relates generally to controlling access to resources in a computing environment and, more particularly, to servers that may leverage globally trusted credentials for authentication without requiring substantial changes to their clients natively configured to access other servers that use locally trusted credentials for authentication.

BACKGROUND

Organizations normally provide authorized users with access to computing resources for performing daily activities. These computing resources often enforce access security policies using various schemes each of which may initially involve proving user identities. When users attempt accessing them, computing resources often request login information (e.g., username and password) that are purported by the users to be valid for themselves or other users, for example. The purported login information may often be authenticated based on some trusted credential maintained for the users.

BRIEF DESCRIPTION OF THE DRAWINGS

The following disclosed technology will become more readily appreciated as the same becomes better understood by reference to the following detailed description, when taken in conjunction with the accompanying drawings, wherein.

DETAILED DESCRIPTION

Figure 1:
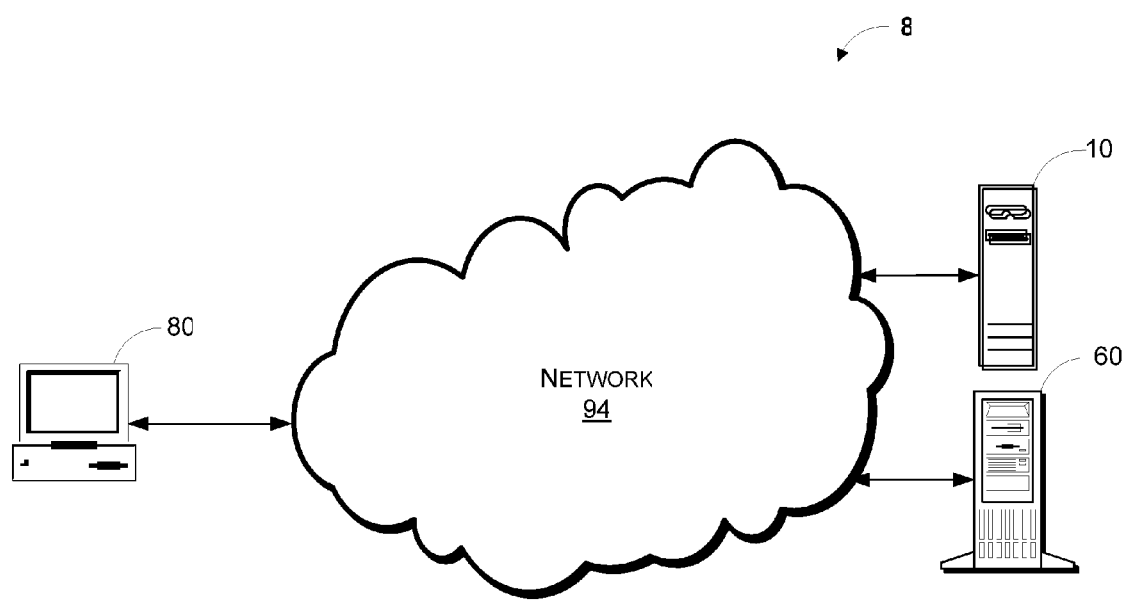
FIG. 1 is a diagram of a system related to computing resource access control.
Figure 11:
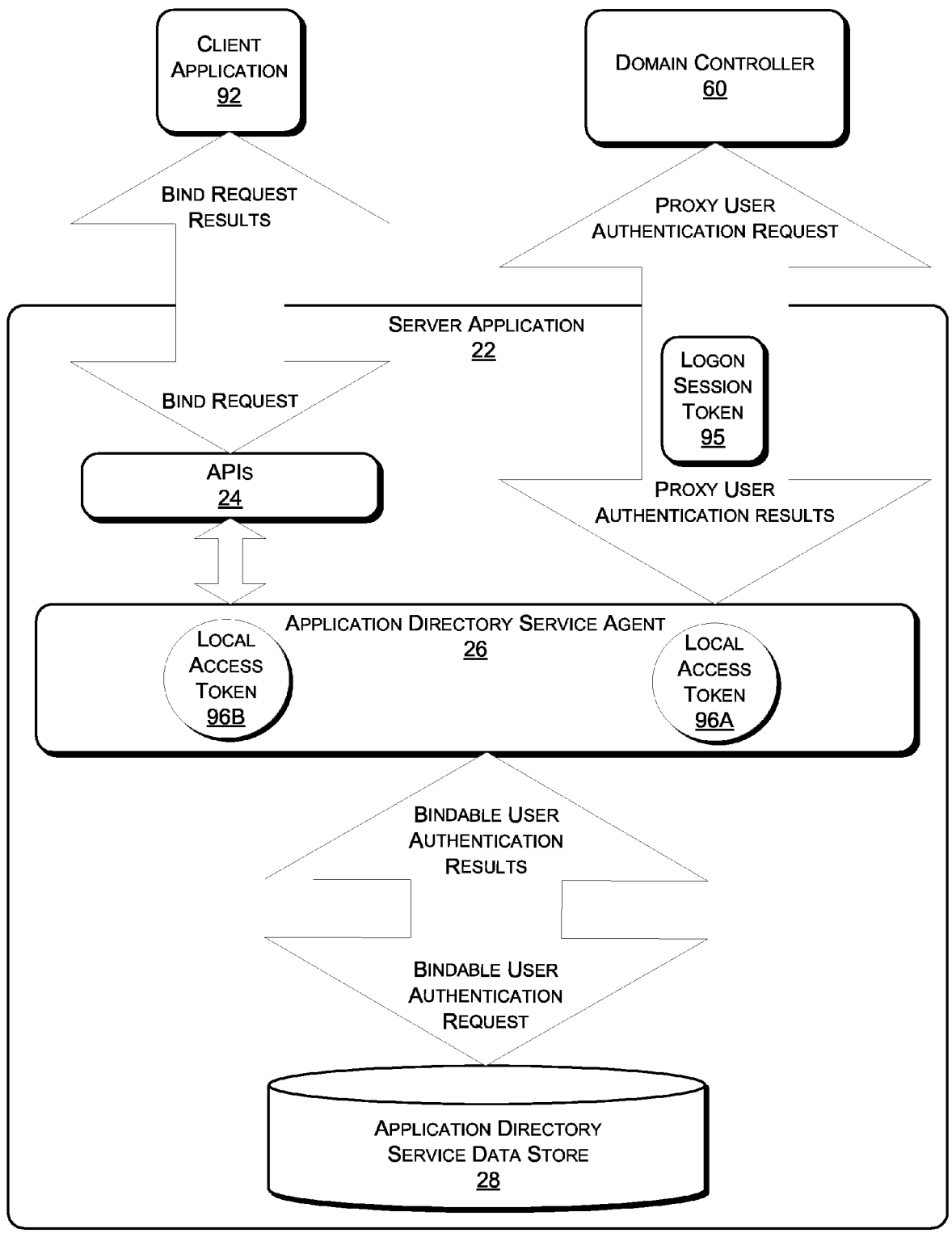
FIG. 11 is a functional block diagram of the system illustrated in FIG. 1 employing another method illustrated in FIG. 12 related to computing resource access control.

Portions of an exemplary system 8 that may be implemented for computing resource access control are shown in FIGS. 1 and 11. System 8 may include application server 10, domain controller 60 and workstation 80 coupled together by network 94. Generally, application server 10 may leverage globally trusted credentials maintained by domain controller 60 for validating purported authentication information (e.g., passwords) provided by users of workstation 80 requesting access to application server 10. However, workstation 80 may be natively configured to request access from other types of computing resources that use locally trusted credentials for authentication. As such, application server 10 may be configured and/or may operate in such a manner that workstation 80 may request access in substantially the same manner it may be natively configured to operate for requesting access, yet server application 10 may leverage globally trusted credentials to validate the user's purported authentication information.

Computing resource access control may be implemented in system 8 for a variety of reasons, such as for restricting access to resources in network 94 that may store sensitive information, and other reasons. One or more server computing resources in network 94 may employ some sort of security infrastructure to implement the resource's and/or network's security policy, such as for user authentication. Further, network environments may often employ various types of server computing resources, such as directory service applications and/or database applications ("service applications"), which may be natively configured to use globally trusted credentials, such as network operating system ("NOS") credentials, maintained for users by one or more separate, trusted authorities. These types of service applications may allow client computing resources, which may interact with the service applications on the users' behalf, to provide the users' purported authentication information (e.g., purported NOS username and password) in connection with requesting access to any one of the various service applications. This enables users to simply use the same authentication information (e.g., usernames and passwords) for accessing the various service applications, which may be validated based on the globally trusted credentials maintained by the separate, trusted authorities.

For instance, the users' globally trusted credentials in a Windows® network environment may be maintained by one or more domain controller servers that may implement a Microsoft® Active Directory® directory service, although globally trusted credentials may be maintained by other types of software applications in other environments. In this specific Windows® network environment example, client computing resources may be configured to make simple authentication and security layer ("SASL") bind calls using one or more credential based authentication methods (e.g., Kerberos v5) for authenticating the users to the service applications based on their globally trusted credentials maintained by the domain controller servers, although other types of calls and credential based methods could be used.

On the other hand, network environments may often also employ various other types of service applications that may be natively configured to use locally trusted credentials maintained by the service applications themselves instead of using globally trusted credentials maintained by one or more separate, trusted authorities. Since these various other types of service applications may maintain their own locally trusted credentials for authentication, however, different service applications may often maintain different trusted credentials for authenticating the same user, for example. As a result, the same user may need to maintain different purported authentication information (e.g., different usernames and passwords) for accessing these various other types of service applications. Managing different authentication information may raise certain issues, such as being burdensome for users and compromising security.

One approach to try to address some of these issues may involve reconfiguring service applications that use locally trusted authentication information so that they may be able to use globally trusted credentials maintained by one or more separate, trusted authorities, although there may be other approaches. However, reconfiguring these service applications may not always be feasible in some computing environments. For instance, client computing resources that may be configured to request access from the service applications that use locally trusted authentication credentials may be configured to operate quite differently for requesting access from those service applications than the way other client computing resources may be configured for requesting access from service applications that use globally trusted authentication credentials.

These client computing resources may be configured differently because the service applications that use locally trusted authentication credentials may be configured to accept particular authentication related calls and information from the client computing resources that may be different from the particular authentication related calls and information that the service applications which use globally trusted authentication credentials may be configured to accept, although there may be other reasons. With reference back to the specific Windows® network environment example discussed earlier, some client computing resources may be configured to make simple bind calls, instead of SASL bind calls, for requesting access on users' behalf to service applications that may use locally trusted authentication credentials, although other types of calls could be used. Reconfiguring service applications to be able to use globally trusted authentication credentials and/or reconfiguring client computing resources to be able to request access to service applications that may use globally trusted authentication credentials may be too costly for some organizations, some organizations may lack the technical expertise to even implement such reconfigurations, and one or more separate, trusted authorities may not maintain globally trusted authentication credentials for some or all of the service applications' users, for example.

System 8 and methods 100, 200 illustrated in FIGS. 1-12 may be implemented in an attempt to address at least some of the issues noted above by not requiring substantially reconfiguring client computing resources to enable them to interact with different types of service applications employing other communication methods that may be different from the communication methods the client resources may be natively configured to implement, although there may be other uses as well. A specific example was provided earlier with respect to reconfiguring client computing resources natively configured to request access to service applications that use locally trusted authentication credentials for enabling them to request access to service applications that use globally trusted authentication credentials.

Rather than reconfigure the client computing resources, the data maintained by those service applications may be imported into server application 22 shown in FIG. 3, which may leverage globally trusted credentials and/or use locally trusted credentials for authentication in the manner described in connection with method 200 illustrated in FIG. 12, for example. Moreover, the client computing resources may request access to server application 22 on users' behalf in substantially the same manner they may request access to service applications that use locally trusted authentication credentials without requiring substantial client-side changes, for example. As a result, a single authentication information experience may be provided to users of those client computing resources in the sense that the same password may be provided on a user's behalf for authentication in connection with requesting access to one or more server applications 22.

Referring now specifically to FIG. 1, an example of a suitable operating environment in which system 8 may be implemented is illustrated. FIG. 1 is not intended to suggest any limitation as to the scope of use or functionality of the system 8. Other types of computing systems, environments, and/or configurations that may be suitable for use with the system 8 include, but are not limited to, hand-held, notebook or laptop devices, multiprocessor systems, microprocessor-based systems, programmable consumer electronics, network PCs, minicomputers, mainframe computers, distributed computing environments that include any of the above systems or devices, and the like.

With reference back to FIGS. 1 and 11, a more specific overview of an exemplary operation of system 8 will now be described. Generally, a user operating workstation 80, for example, may attempt accessing server application 22 on application server 10. As mentioned above, server application 22 may store data that may have been imported from other service applications that may not be natively configured to leverage globally trusted credentials for authentication, but for which doing so may be desired without substantially reconfiguring any client computing resources. In any event, workstation 80 may provide server application 22 with purported authentication information (e.g., username and password), which in turn the user may have provided to workstation 80 for asserting that they or someone else is an authorized user. Server application 22 may authenticate a portion of the purported authentication information (e.g., password) without involving domain controller 60 if it maintains locally trusted authentication credentials which could be used to verify the purported authentication information.

On the other hand, server application 22 may not maintain any locally trusted credentials which could be used to verify the portion of the purported authentication information. In that case, server application 22 may request domain controller 60 to verify the portion of the purported authentication information based on globally trusted credentials maintained by controller 60 for the user. In either case, the user of workstation 80 may be allowed to access and interact with server application 22 if the portion of the purported authentication information is successfully authenticated. As such, the components of system 8 shown in FIG. 1 will now be described in further detail with reference to FIGS. 2-9.

Figure 2:
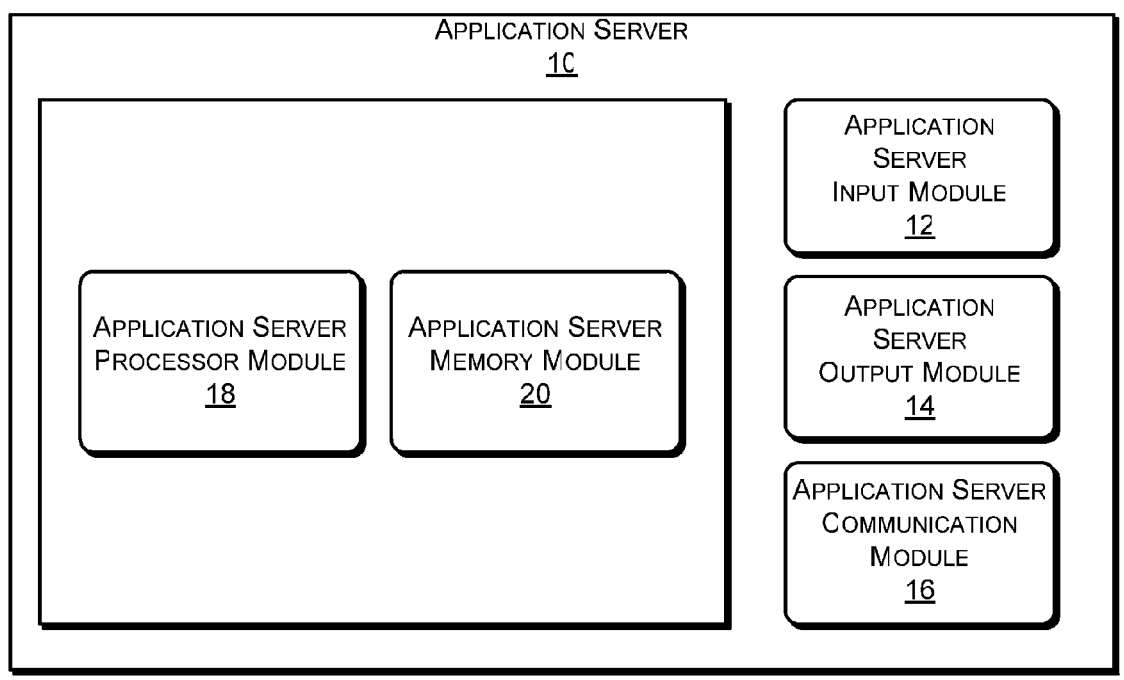
FIGS. 2-3 are diagrams of an application server computing resource that may be used in the system illustrated in FIG. 1.
Figure 3:
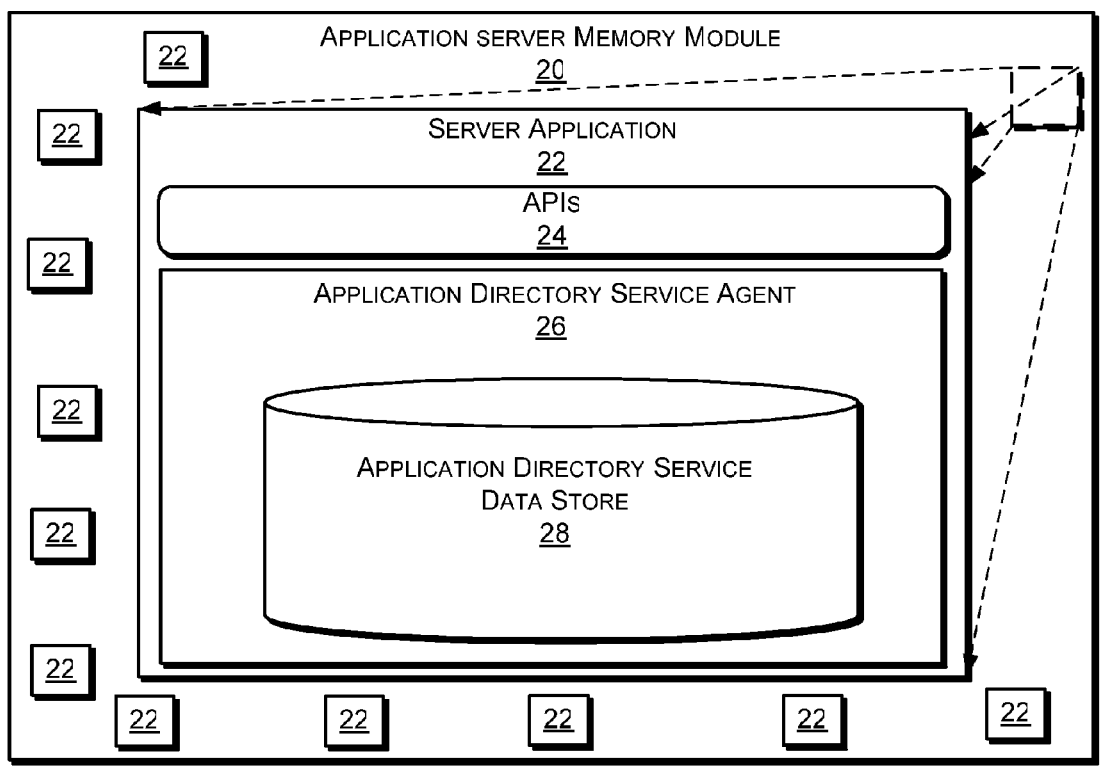

Referring now to FIGS. 2-3, in its most basic configuration, application server 10 may comprise application server input module 12, application server output module 14, application server communication module 16, application server processor module 18 and application server memory module 20, which may be coupled together by one or more bus systems or other communication links, although application server 10 may comprise other modules in other arrangements.

Referring specifically to FIG. 2, application server input module 12 may comprise one or more user input devices, such as a keyboard and/or mouse, and any supporting hardware. Application server input module 12 may enable a user who is operating application server 10 to generate and transmit signals or commands to application server processor module 18.

Application server output module 14 may comprise one or more user output devices, such as a computer monitor (e.g., CRT, LCD or plasma display) and/or printer, and any supporting hardware, although other types of output devices may be used. Application server output module 14 may present one or more results from application server processor module 18 executing instructions stored in application server memory module 20.

Application server communication module 16 may comprise one or more communication interface devices, such as wire-based (e.g., Ethernet) or wireless network adapters, and any supporting hardware, although other types of communication interface devices may be used, such as serial port interfaces (e.g., RS-232). Application server communication module 16 may enable application server 10 to transmit data to and receive data from other devices via network 94, such as domain controller 60 and/or workstation 80, using one or more communication protocols, such as TCP/IP, HTTP and SSL, although application server communication module 16 may transmit/receive data to/from other computing systems or peripherals (e.g., external memory storage device or printer) via other communication media, such as direct cable connections, and may use other protocols.

Application server processor module 18 may comprise one or more devices that may access, interpret and execute instructions and other data stored in application server memory module 20 for controlling, monitoring and managing (hereinafter referred to as "operating" and variations thereof) application server input module 12, application server output module 14, application server communication module 16 and application server memory module 20 as described herein, although some or all of the instructions and other data may be stored in and/or executed by the modules themselves.

Figure 10:
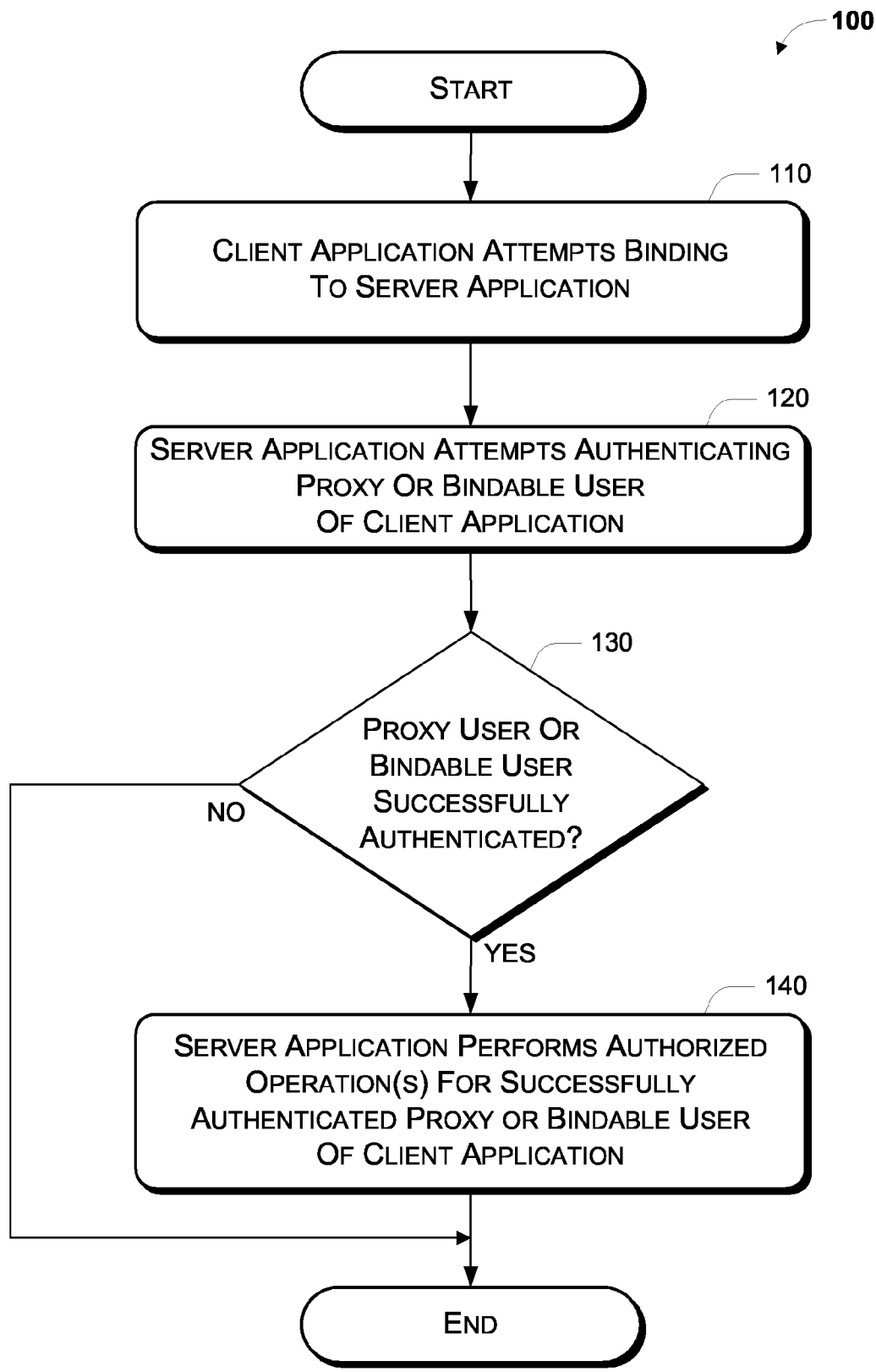
FIG. 10 is a flow chart of a method related to computing resource access control that may be employed in the system illustrated in FIG. 1.
Figure 12:
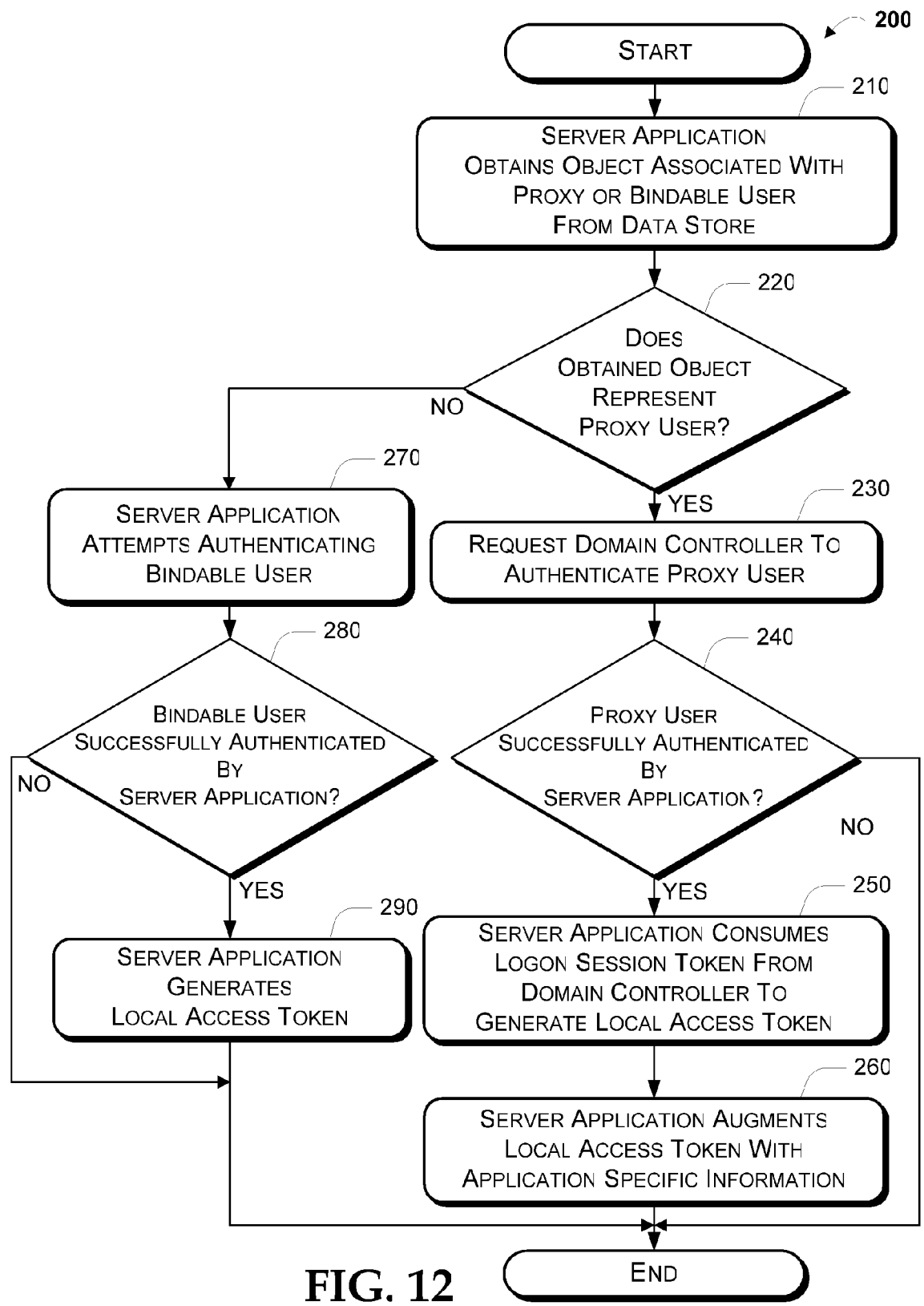
FIG. 12 is a flow chart of another method related to computing resource access control that may be employed in connection with the method illustrated in FIG. 10.

Additionally, application server processor module 18 may access, interpret and execute instructions and other data stored in application server memory module 20 to perform functions for implementing at least a portion of the methods 100, 200 illustrated in FIGS. 10 and 12, respectively, although processor module 18 may perform other functions, one or more other processing devices or systems may perform some or all of these functions, and processor module 18 may comprise circuitry configured to perform the functions described herein.

Application server memory module 20 may comprise one or more types of fixed and/or portable memory accessible by application server processor module 18, such as ROM, RAM, SRAM, DRAM, DDRAM, hard and floppy-disks, optical disks (e.g., CDs, DVDs), magnetic tape, ferroelectric and ferromagnetic memory, electrically erasable programmable read only memory, flash memory, charge coupled devices, smart cards, or any other type of computer-readable media, which are read from and/or written to by one or more magnetic, optical, or other appropriate reading and/or writing systems coupled to application server processor module 18 and/or one or more other processing devices or systems.

Application server memory module 20 may store at least a portion of the instructions and data that are accessed, interpreted and/or executed by application server processor module 18 for operating application server input module 12, application server output module 14, and application server communication module 16, although some or all of the instructions and data may be stored elsewhere, such as in the modules themselves and/or the application server processor module 18.

Referring specifically to FIG. 3, application server memory module 20 may also store one or more server applications 22, although one or more server applications 22 may be stored at domain controller 60, workstation 80 and/or elsewhere. At least one of the server applications 22 may comprise APIs 24, application directory service agent 26 and application directory data store 28. One of these server applications 22 is shown in FIG. 3 with three separate modules 24, 26 and 28 for ease of description and exemplary purposes only, as a fewer or greater number and other types of modules may be used. Moreover, one or more modules 24, 26 and 28 may reside on one or more other computing systems or devices and the functionality of one or more of the modules as described herein may be combined, separated, and/or distributed amongst one or more other systems.

APIs 24 may comprise one or more "C," "C#," and/or "DCOM" application program interfaces that are compliant with request for comment ("RFC") 1823 related to the light weight directory protocol ("LDAP"), although APIs may comprise other types of interfaces. Currently, LDAP is defined by RFC's 2251-2256, 2798, 2829, 2830, 3377 and 3383 published by the Internet Engineering Task Force ("IETF") at www.ietf.org, which are all incorporated by reference herein in their entirety, although other RFC's may define LDAP.

APIs 24 may expose one or more methods that client computing resources, such as client application 92 running on workstation 80, may access by making one or more LDAP calls to server 23 for searching, reading, writing, deleting and/or modifying data stored in application directory service data store 28, although the interfaces may enable other operations to be performed for other clients, such as another application or user at application server 10, and other methods may be exposed for enabling non-LDAP calls to be made. Additionally, APIs 24 may comprise a remote procedure call ("RPC") interface for enabling clients, such as users of application server 10, to perform administrative tasks on the application directory service data store 28, such as importing, exporting, indexing, replicating, backing-up, and/or restoring data.

Application directory service agent 26 may comprise an LDAP based directory service configured in the manner described herein to implement methods 100, 200 illustrated in FIGS. 10 and 12, respectively, although other types of directory services or databases that may be configured and/or operate in the manner described herein may be used. Application directory service agent 26 may implement one or more operations expressed by one or more LDAP calls made by client computing resources for interacting with server application 22 in the manner described herein, although other communication architectures may be used, such as the messaging application programming interface ("MAPI") protocol.

Application directory service data store 28 may comprise an LDAP based information directory stored within application server memory module 20 in one or more files that logically organizes data into a hierarchical tree-like data structure, although non-LDAP based directories, such as relational databases and other types of data repositories, may be used; data store 28, or portions thereof, may reside elsewhere; more than one data store 28 may be used; and/or the data may be logically organized into other types of data structures. The data in application directory service data store 28 may be used to describe one or more security principals in network 94.

Generally, security principals may comprise one or more resources in network 94 that may have access to one or more other resources in network 94 based on established security policies. Examples of security principals in network 94 may include users, network services, network devices (e.g., computers) or groups of one or more security principals, although security principals may represent other resources in network 94, other resources in other networks, and/or other resources within application server 10, for instance. At least one of either server application 22 or domain controller 60 may manage one or more security principals in network 94 by maintaining account information for the security principals, such as trusted credentials that may be used to authenticate purported authentication information provided by a user asserting to be the security principal, and other information.

Figure 4:
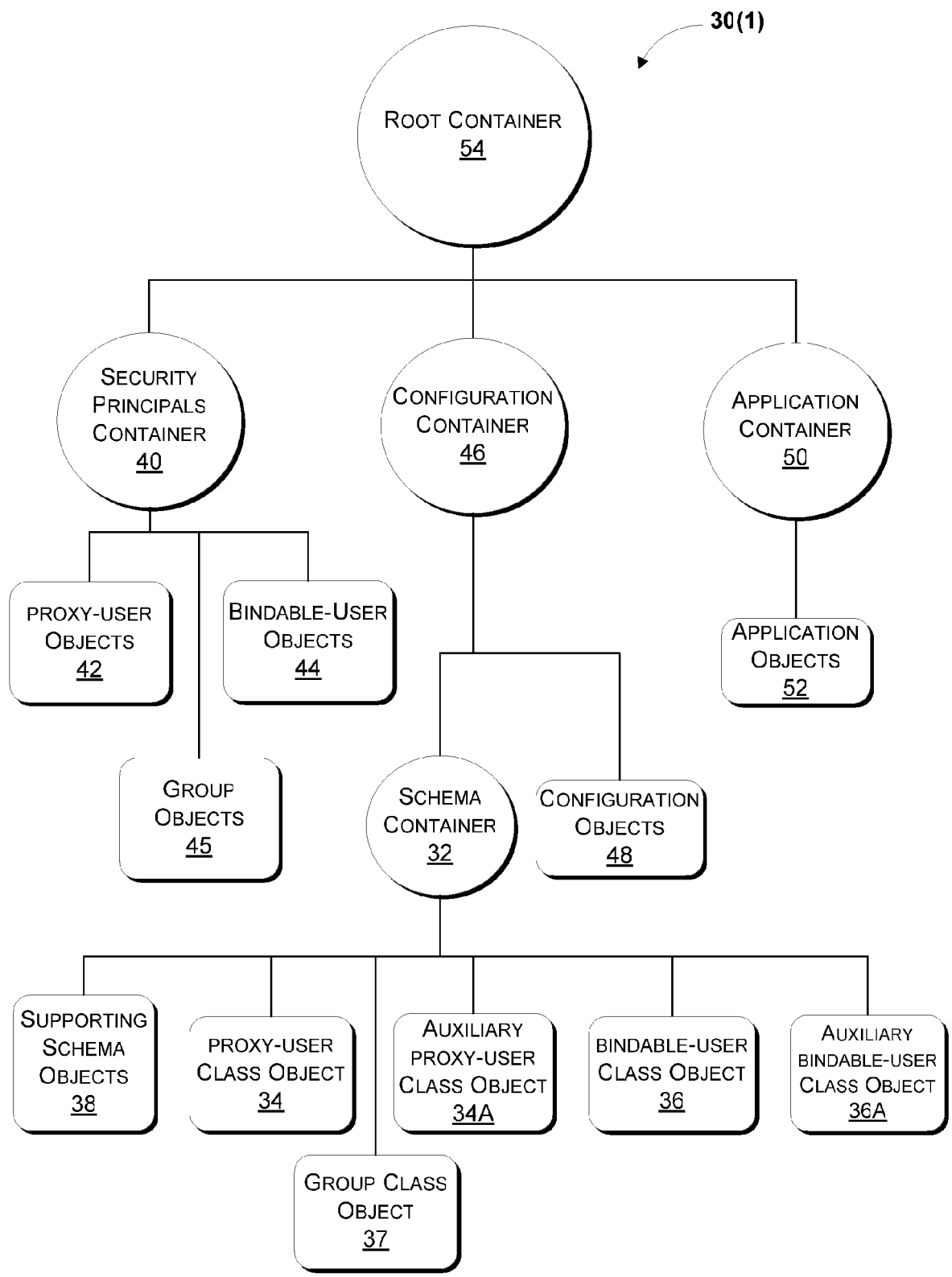
FIGS. 4-5 are diagrams of directory trees that may be used to organize data maintained in the application server computing resource illustrated in FIGS. 2-3.

Referring now to FIG. 4, an example of how the data in application directory service data store 28 may be logically organized into a hierarchical tree-like data structure will now be described, although again, the data may be logically organized in data store 28 in a variety of ways. First directory tree 30(1) may comprise one or more information directory entries, such as objects 32-54, which may represent at least a portion of the data stored in data store 28. The namespace for first directory tree 30(1) will now be described. Each of the entries in first directory tree 30(1) may be uniquely identified by a distinguished name ("DN"). Each entry may also have a relative distinguished name ("RDN") that may be local to its immediate container entry. Examples of container entries used in first directory tree 30(1) include schema container 32, security principals container 40, configuration container 46, application container 50 and root container 54, although other containers could be used.

Further, at least one entry in first directory tree 30(1) may have one or more attributes that may be used to describe or name the entry, such as a common name ("cn") attribute. The DN of at least one entry in first directory tree 30(1) may be formed by concatenating the RDN of the entry with the RDN of the container entries between the entry and a base container entry, such as root container 54. As an example of how the namespace may be used to identify an arbitrarily selected entry in first directory tree 30(1), the DN of a proxy-user object 42 may be expressed as "DN: cn=proxy-user object 42, cn=security principals container 40, DC=root container 54."

Schema container 32 may comprise an entry in first directory tree 30(1) having one or more child entries representing at least a portion of the schema for first directory tree 30(1), such as proxy-user class object 34, auxiliary proxy-user class object 34A, bindable-user class object 36, auxiliary bindable-user class object 36A, group class object 37 and supporting schema objects 38, although the schema container 32 and its child entries may be stored apart from tree 30(1), such as in a text file within application server memory module 20, or elsewhere.

Proxy-user class object 34 may comprise one or more entries in first directory tree 30(1) representing a structural schema class having one or more attributes for describing one or more properties of a proxy user, although other schema class objects may be used in place of class object 34, such as user-defined schema class objects. A proxy user may represent a security principal in network 94, such as a user, which may be represented by one or more proxy-user objects 42 in first directory tree 30(1) for which no trusted credentials may be maintained by server application 22 but for which domain controller 60 may maintain globally trusted credentials, although proxy users may be represented by other objects in tree 30(1). Proxy-user class object 34 may have one or more auxiliary class attributes (e.g., "systemAuxiliaryClass") that may identify one or more auxiliary schema classes associated with class object 34, such as auxiliary proxy-user class object 34A. Instances of proxy-user class object 34, such as proxy-user objects 42, may include one or more attributes from auxiliary proxy-user class object 34A depending upon how those auxiliary class attributes are defined in auxiliary proxy-user class object 34A, as described in further detail below. Further, proxy-user class object 34 may be structured using any number of schema formats.

Proxy-User Class Object 34 Example

A pseudo-code example of schema that may be used to form at least a portion of proxy-user class object 34 is provided below in Table 1:

TABLE 1 dn: cn=proxy-user class object 34, cn=schema container 32,
   cn=configuration container 46, DC=root container 54
objectClass: classSchema
subClassOf: Top
cn: proxy-user class object 34
objectClassCategory: 1
systemAuxiliaryClass: auxiliary proxy-user class object 34A The exemplary schema in Table 1, as well as the ensuing schema examples included in Tables 2-8, are provided for explanatory and demonstrative purposes only, and may be expressed without undue experimentation in a variety of other ways, such as actual LDAP schema statements, for example, written in any schema format and following any syntax format. Moreover, the schema examples included herein may not recite complete LDAP schema definitions and they may include more or less information. Still further, proxy-user class object 34, or any other schema classes in first directory tree 30(1), may also have one or more attributes, such as an "objectClassCategory" attribute, which may identify object 34's schema class type, such as abstract, structural or auxiliary, although schema class types may be identified in other ways. The "objectClassCategory" attribute in proxy-user class object 34 may be assigned a numeric value of one to identify object 45 as being a structural schema class, for example, although other values may be used to identify a structural schema class type. Moreover, the "objectClassCategory" attribute may be assigned a numeric value of two to identify an abstract schema class type or value of three to identify an auxiliary class schema class type, for example, although other values may be used to identify abstract and auxiliary schema class types.

Auxiliary proxy-user class object 34A may comprise one or more entries in first directory tree 30(1) representing an auxiliary schema class having one or more attributes for describing one or more properties of a security principal in network 94, such as a proxy user. Further, auxiliary proxy-user class object 34A may comprise one or more attributes representing a security identifier ("SID"), such as an "objectSid" attribute, which application directory service agent 26 may use to identify an account managed for a security principal by domain controller 60 that corresponds to the proxy user. A SID may represent a unique value used by domain controller 60 to identify the managed security principal. Also, the "objectSid" attribute may be qualified by another schema attribute, such as a "systemMustContain" attribute, which may express that the attribute may be required in entries representing instantiations of one or more structural schema classes with auxiliary proxy-user class object 34A as an associated auxiliary class. Associating auxiliary proxy-user class object 34A with proxy-user class object 34 may provide at least one utility, such as ensuring that proxy-user objects 42 may include at least one attribute that application directory service agent 26 may use to identify security principals managed by domain controller 60 for which globally trusted credentials may be leveraged for authentication, as discussed further herein below in connection with methods 100, 200 illustrated in FIGS. 10 and 12, respectively.

Further, auxiliary proxy-user class object 34A may also include one or more attributes, such as a "memberOf" attribute, which may identify one or more groups, such as group objects 45, that proxy users (e.g., proxy-user objects 42) may be a member of, although the groups may be identified in other ways. The "memberOf" attribute may be a multi-valued attribute that may identify one or more group objects 45 by the object 45's DN, for example. Also, the "memberOf" attribute may be linked to one or more "member" attributes that may be included in group objects 45. For instance, entries in first directory tree 30(1) with a "memberOf" attribute identifying one or more group objects 45 correspondingly may be identified by "member" attributes in one or more of the identified group objects 45. Server applicaton 22 may maintain one or more linked relationships between corresponding "memberOf" and "member" attributes in application server memory module 20, although the relationships may be maintained using databases, other types of data stores or any other way that may be used to express the relationships.

Auxiliary Proxy-User Class Object 34A Example

A pseudo-code example of schema that may be used to form at least a portion of auxiliary proxy-user class object 34A is provided below in Table 2:

TABLE 2 dn: cn=auxiliary proxy-user class object 34A, cn=schema container 32,
    cn=configuration container 46, dc=root container 54
objectClass: classSchema
subClassOf: Top
cn: auxiliary proxy-user class object 34A
; This is an Auxiliary Class
objectClassCategory: 3
systemMustContain: objectSid
systemMayContain: memberOf Bindable-user class object 36 may comprise one or more entries in first directory tree 30(1) representing a structural schema class having one or more attributes for describing one or more properties of a bindable user, although other schema class objects may be used in place of class object 36, such as user-defined schema class objects. A bindable user may represent a security principal in network 94, such as a user, which may be represented by one or more bindable-user objects 44 in directory tree 30(1) for which locally trusted credentials may be maintained for by server application 22, although bindable users may be represented by other objects in tree 30(1) and domain controller 60 may also maintain globally trusted credentials for the bindable users. Further, bindable-user class object 36 may have one or more auxiliary class attributes, such as "systemAuxiliaryClass," which may identify auxiliary bindable-user class object 36A as being an associated auxiliary schema class. Instances of bindable-user class object 36, such as bindable-user objects 44, may include one or more attributes from auxiliary bindable-user class object 36A depending upon how those auxiliary class attributes are defined in auxiliary object 36A, as described in further detail below. Bindable-user class object 36 may be structured in accordance with RFC's 2252 and 2256 using any schema format, although class object 36 may be structured to include one or more attributes from the "inetOrgPerson" class defined in RFC 2798 or variations thereof.

Bindable-User Class Object 36 Example

A pseudo-code example of schema that may be used to form at least a portion of bindable-user class object 36 is provided below in Table 3:

TABLE 3 dn: cn=bindable-user class object 36, cn=schema container 32,
    cn=configuration container 46, DC=root container 54
objectClass: classSchema
subClassOf: Top
cn: bindable-user class object 36
objectClassCategory: 1
systemAuxiliaryClass: auxiliary bindable-user class object 36A Auxiliary bindable-user class object 36A may comprise one or more entries in first directory tree 30(1) representing an auxiliary schema class having one or more attributes for describing one or more properties of a security principal in network 94, such as a bindable user. Further, auxiliary bindable-user class object 36A may comprise one or more attributes representing a locally trusted credential, such as a "unicodePwd" attribute, which application directory service agent 26 may use to authenticate purported authentication information provided for an identified security principal managed by server application 22. Also, the "unicodePwd" attribute may be qualified by the "systemMustContain" attribute to express that the attribute may be required in entries representing instantiations of one or more structural schema classes with auxiliary bindable-user class object 36A as an associated auxiliary class. Associating auxiliary bindable-user class object 36A with bindable-user class object 36 may provide at least one utility, such as ensuring bindable-user objects 44 in first directory tree 30(1) may include at least one trusted credential that application directory service agent 26 in server application 22 may use for authentication, as discussed further herein below in connection with methods 100, 200 illustrated in FIGS. 10 and 12, respectively. Further, auxiliary bindable-user class object 36A may also include one or more attributes, such as the "memberOf" attribute, which may identify one or more groups, such as group objects 45, that bindable users (e.g., bindable-user objects 44) may be a member of, although the groups may be identified in other ways.

Auxiliary Bindable-User Object 36A Example

A pseudo-code example of schema that may be used to form at least a portion of auxiliary bindable-user class object 36A is provided below in Table 4:

TABLE 4 dn: cn=auxiliary bindable-user class object 36A, cn=schema container 32,
    cn=configuration container 46, dc=root container 54
objectClass: classSchema
subClassOf: Top
cn: auxiliary bindable-user class object 36A
; This is an Auxiliary Class
objectClassCategory: 3
systemMustContain: unicodePwd
systemMayContain: objectSid
systemMayContain: memberOf Supporting schema objects 38 may comprise one or more entries in first directory tree 30(1) representing one or more class schema entries, such as a "Top" class and a "classSchema" class, as well as other class schema entries and attribute schema entries, which may support class objects 34, 34A, 36, 36A and 37 in first directory tree 30(1). The class and attribute schema entries represented by supporting schema objects 38 may be referenced by the schema in one or more class objects objects 34, 34A, 36, 36A, or 37, although other classes may reference the classes and attributes in supporting schema objects 38. Pseudo-code examples of the class schema entries that may be used to form one or more portions of supporting schema objects 38 are provided further below in Table 8 under the "Additional Schema Definitions" section. Additional schema information is available on the Internet at www.msdn.microsoft.com, the schema content of which is incorporated by reference herein in its entirety. Furthermore, supporting schema objects 38 may comprise a subschema container entry (not illustrated) having one or more subschema child entries representing one or more other portions of the schema for first directory tree 30(1) that may include information about the supported classes and attributes in objects 34, 34A, 36, 36A, 37 and 38. Client computing resources, such as workstation 80, which may be unfamiliar with the topology of application directory service agent 26 in server application 22, may access the subschema entries within supporting schema objects 38 to determine how to interact with directory service agent 26.

Group class object 37 may comprise one or more entries in first directory tree 30(1) representing a structural schema class having one or more attributes for describing one or more properties of a group, such as identification of "group members," although other schema class objects may be used in place of class object 37. Group members may comprise one or more security principals in network 94, such as one or more bindable users, proxy users, other types of security principals, or other groups. Further, the "member" attribute may be included in group class object 37 for identifying the one or more group members, although other attributes or methods may be used to identify the group members. The "member" attribute may be a multi-valued attribute that may identify the group members by their DN. Moreover, the "member" attribute values may be stored in server memory module 20 in the form of object identifier values that uniquely identify one or more of the group members corresponding to one or more of the entries in first directory tree 30(1), such as proxy-user objects 42, bindable-user objects 44 and group objects 45.

Group class object 37 may be instantiated to generate one or more group objects 45 where one or more groups may be defined in the "member" attribute, for example. Group class object 37 may also include one or more attributes, such as the "memberOf" attribute, which may identify one or more other groups that objects 37 may be a member of themselves, and may also be a multi-valued attribute identifying the DN of one or more group objects 45, although the groups may be identified in other ways. Additionally, group class object 37 may be structured in accordance with RFC's 2252 and 2256 using any schema format.

Group Class Object 37 Example

A pseudo-code example of schema that may be used to form at least a portion of group class object 37 is provided below in Table 5:

TABLE 5 dn: cn=group class object 37, cn=schema container 32,
   cn=configuration container 46,
      dc=root container 54
objectClass: classSchema
subClassOf: Top
cn: group class object 37
objectClassCategory: 1
systemMustContain: member
systemMayContain: memberOf
systemMustContain: objectSid Proxy-user objects 42 may comprise one or more entries in first directory tree 30(1) representing one or more instances of the class schema defined in proxy-user class object 34, although proxy-user objects 42 may comprise instances of other class schema. Although a single box depicts proxy-user objects 42 in FIG. 4, it should be appreciated that objects 42 may represent one or more separate and/or distinct objects 42 having the same or different information. Proxy-user objects 42 may also include one or more attributes from auxiliary proxy-user class object 34A depending upon whether those attributes may be defined in auxiliary class object 34A as being required, such as by using the "systemMustContain" attribute. Proxy-user objects 42 may be initially generated by users of application server 10 using LDAP "Add" calls made on application directory service agent 26 via APIs 24 and processed by agent 26 to generate instances of proxy-user class object 34, for example, although proxy-user objects 42 may be generated from existing entries from other directory service data stores through the construction and importation of LDIF format files, using a synchronization mechanism, such as Microsoft® Identity Integration Server 2003® ("MIIS"), or in other ways.

As mentioned earlier, proxy-user objects 42 may lack trusted credentials that may enable server application 22 to authenticate at least a portion of some purported authentication information, such as passwords, provided by clients, such as client application 92 of workstation 80, which may request access to server application 22. Proxy-user objects 42 may maintain other information (e.g., "objectSid" attribute value), however, which server application 22 may use for requesting domain controller 60 to validate the purported authentication information based on globally trusted credentials maintained by controller 60, as discussed further below in connection with method 200 at step 230. Configuring server application 22 for leveraging globally trusted credentials maintained for proxy users by domain controller 60 rather using locally trusted credentials maintained by application 22 in proxy-user objects 42 may provide utility in some network environments, such as network 94. For instance, proxy users may be able to provide the same purported authentication information (e.g., passwords) for accessing a variety of different server applications 22 that may be used for different purposes, network overhead may be reduced since a fewer number of the proxy users' trusted credentials may be maintained throughout the network 94, and network security may be enhanced since a fewer number of resources in network 94 may maintain the credentials for the proxy users.

Bindable-user objects 44 may comprise one or more entries in first directory tree 30(1) representing one or more instances of the class schema defined in bindable-user class object 36, although bindable-user objects 42 may comprise instances of other class schema. Although a single box depicts bindable-user objects 44 in FIG. 4, it should be appreciated that objects 44 may represent one or more separate and/or distinct objects 44 having the same or different information. Bindable-user objects 44 may also include one or more attributes from auxiliary bindable-user class object 36A depending upon whether those attributes may be defined in auxiliary class object 36A as being required, such as by using the "systemMustContain" attribute. Bindable-user objects 44 may be initially generated in the same manner as proxy-user objects 42, although bindable-user objects 44 may be generated in other ways. As mentioned earlier, bindable-user objects 44 may maintain locally trusted credentials (e.g., "unicodePwd" attribute value) that may enable application directory service agent 26 to authenticate at least a portion of some purported authentication information, such as passwords, provided by clients, such as client application 92 of workstation 80.

Group objects 45 may comprise one or more entries in first directory tree 30(1) representing one or more instances of the class schema defined in group class object 37, although group objects 45 may comprise instances of other class schema. Although a single box depicts group objects 45 in FIG. 4, it should be appreciated that objects 45 may represent one or more separate and/or distinct objects 45 having the same or different information. Group objects 45 may be initially generated in the same manner as proxy-user objects 42 or bindable-user objects 44, although group objects 45 may be generated in other ways. As mentioned earlier, group objects 45 may be instantiations of class object 36 that may describe one or more properties of one or more groups of security principals, such as their group members.

Configuration container 46 may comprise an entry in first directory tree 30(1) having one or more child entries, such as schema container 32 and one or more configuration objects 48.

Configuration objects 48 may comprise one or more entries in first directory tree 30(1) representing the architecture of application directory service data store 28, replication schedules and topology for the entries in first directory tree 30(1), and other information for enabling clients to perform administrative and other tasks on data store 28. Configuration objects 48 may be initially generated in the same manner as proxy-user objects 42 or bindable-user objects 44, although objects 48 may be generated in other ways.

Application container 50 may comprise an entry in first directory tree 30(1) having one or more child entries, such as one or more application objects 52.

Application objects 52 may comprise one or more entries in first directory tree 30(1) representing application specific information for server application 22 and other information. For instance, if server application 22 comprises an employee directory server application for an organization, application objects 52 may have one or more attributes that may describe office equipment that may be used by security principals in network 94, such as proxy users or bindable users. Application objects 52 may be initially generated in the same manner as proxy-user objects 42, bindable-user objects 44, group objects 45 or configuration objects 48, although objects 52 may be generated in other ways.

Root container 54 may comprise a base entry for first directory tree 30(1) representing one or more characteristics of tree 30(1), such as one or more naming contexts that identify the location of one or more container entries (e.g., security principals container 40, configuration container 46, schema container 32 and application container 50), although root container 54 may represent other information. Further, root container 54 may represent the base DN that client computing resources in network 94 may use to reference application directory data store 28 in server application 22, such as a domain name service ("DNS") name that server application 22 may be identified by in network 94.

Figure 5:
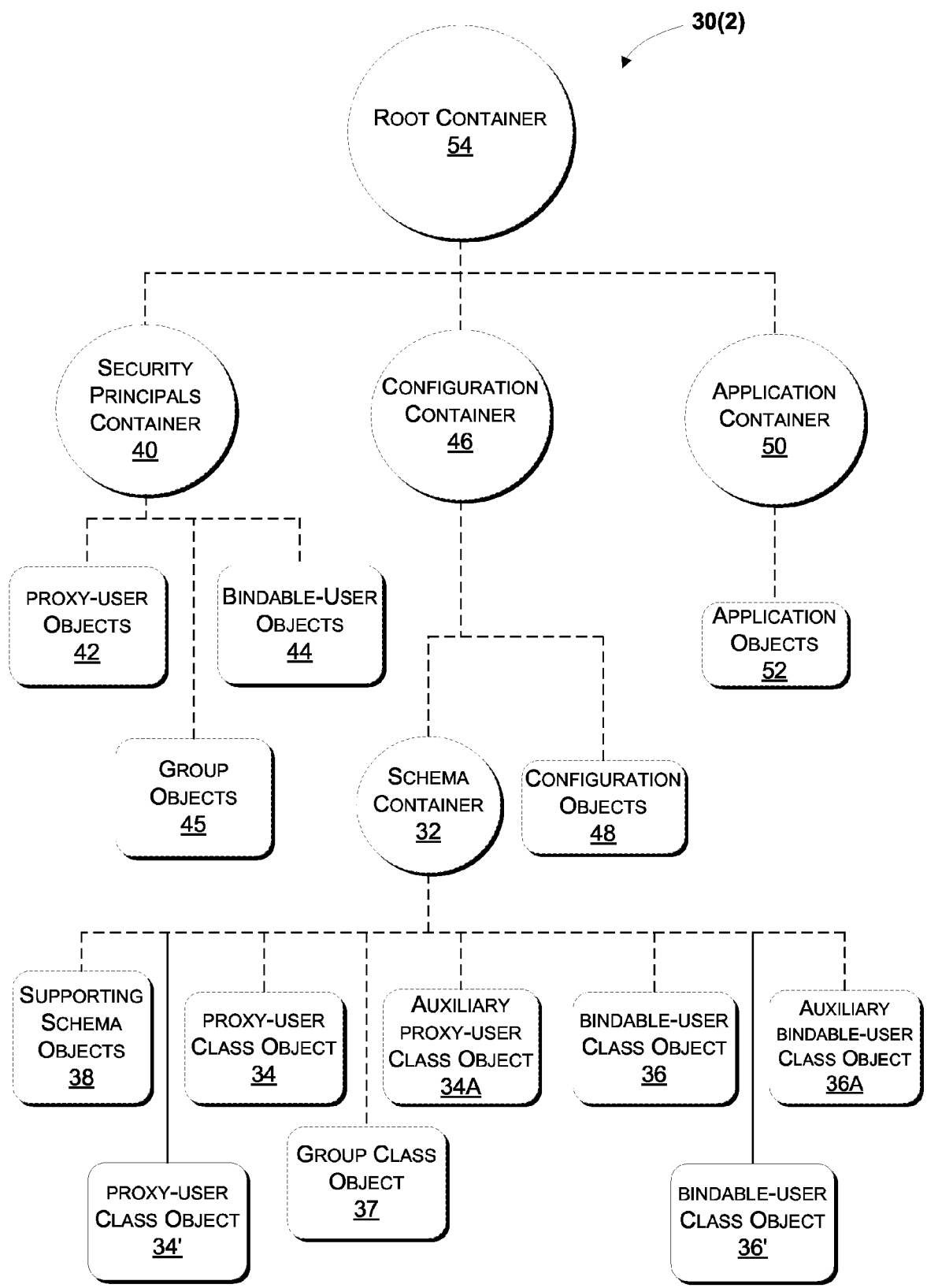

Referring now to FIG. 5, a second directory tree 30(2) that may be used to organize data in application directory service data store 28 shown in FIG. 3 will now be described. Basically, second directory tree 30(2) may be identical to first directory tree 30(1) described above in connection with FIG. 4, except schema container 32 in second directory tree 30(2) may also have at least one of either proxy-user class object 34' and bindable-user class object 36' as child entries.

Proxy-user class object 34' may be the same as proxy-user class object 34, except object 34' may also include the one or more attributes representing the security identifier (e.g., "objectSid") described above as being included in auxiliary proxy-user 34A in first directory tree 30(1).

Proxy-User Class Object 34' Example

A pseudo-code example of schema that may be used to form at least a portion of proxy-user class object 34' is provided below in Table 6:

TABLE 6 dn: cn=proxy-user class object 34', cn=schema container 32,
   cn=configuration container 46, DC=root container 54
objectClass: classSchema
subClassOf: Top
cn: proxy-user class object 34'
objectClassCategory: 1
systemMustContain: objectSid
systemMayContain: memberOf Bindable-user class object 36' may be the same as bindable-user class object 36, except object 36' may also include the one or more attributes representing the locally trusted credential (e.g., "unicodepwd" attribute value) described above as being included in auxiliary bindable-user 36A in first directory tree 30(1).

Bindable-User Class Object 36' Example

A pseudo-code example of schema that may be used to form at least a portion of bindable-user class object 36' is provided below in Table 7:

TABLE 7 dn: cn=bindable-user class object 36', cn=schema container 32,
   cn=configuration container 46, DC=root container 54
objectClass: classSchema
cn: bindable-user class object 36'
objectClassCategory: 1
systemMustContain: unicodePwd
systemMayContain: objectSid
systemMayContain: memberOf Further, supporting schema objects 38 may also define one or more schema classes and schema attributes referenced by one or more classes defined in proxy-user class object 34' or bindable-user object 36'. Security principals container 40 may also have proxy-user objects 42 or bindable-user objects 44 that are instances of proxy-user class object 34' or bindable-user object 36', respectively, as child entries. One or more of the proxy-user objects 42 may represent instances of proxy-user class object 34' and one or more bindable-user objects 44 may represent instances of bindable-user class object 36'. Still further, configuration container 46, configuration objects 48, application container 50, application objects 52 and root container 54 in second directory tree 30(2)

may also maintain information that reflects the existence of one or more of proxy-user class object 34' or bindable-user class object 36' and instances thereof (e.g., proxy-user objects 42, bindable-user objects 44).

Figure 6:
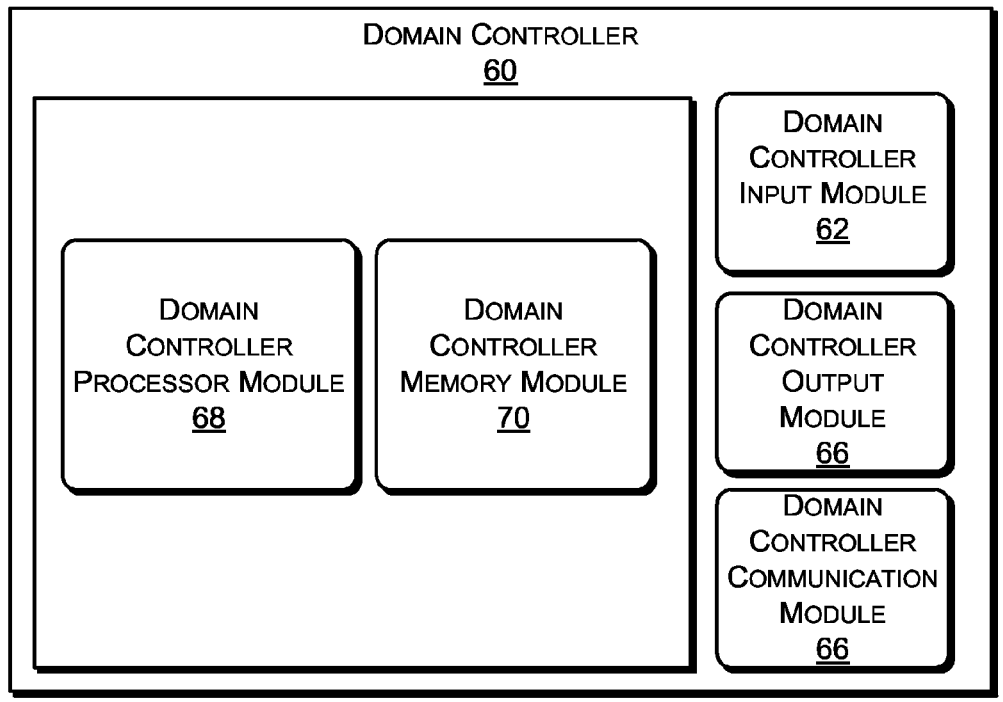
FIGS. 6-7 are diagrams of a separate, trusted authority computing resource, which may be used for validating purported authentication information provided by a client computing resource in the system illustrated in FIG. 1 in connection with requesting access to the application server computing resource illustrated in FIGS. 2-3.
Figure 7:
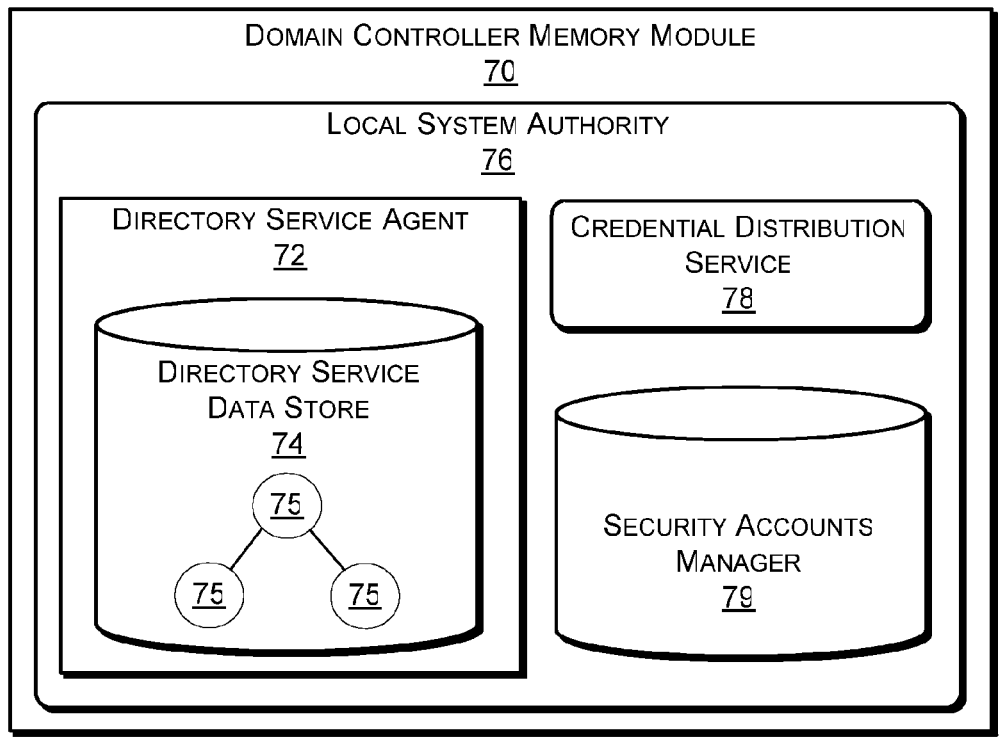

Referring generally to FIGS. 6-7, in its most basic configuration, domain controller 60 may comprise domain controller input module 62, domain controller output module 64, domain controller communication module 66, domain controller processor module 68 and domain controller memory module 70, which may be coupled together by one or more bus systems or other communication links, although domain controller 60 may comprise other modules in other arrangements.

Referring specifically to FIG. 6, modules 62, 64, 66, 68 and 70 may be identical to modules 12, 14, 16, 18 and 20 shown in FIG. 2 and described above in connection with application server 10, except the modules 62-70 may perform functions for domain controller 60 as discussed herein. For instance, domain controller processor module 68 may access, interpret and execute instructions and other data stored in domain controller memory module 70 to enable domain controller 60 to operate modules 62-70 and implement at least a portion of the methods 100, 200 illustrated in FIGS. 10 and 12, respectively, as described further herein below.

Referring specifically to FIG. 7, domain controller memory module 70 may also store directory service agent 72, directory service data store 74, local system authority 76, credential distribution service 78, and security accounts manager 79, although some or all of these modules 72-79 may be stored elsewhere. Modules 72-79 may comprise instructions written in a number of programming languages and/or data, which when accessed, interpreted and/or executed by domain controller processor module 68, cause domain controller 60 to implement at least a portion of the methods 100, 200 illustrated in FIGS. 10 and 12, respectively, and described further herein below.

Directory service agent 72 may comprise an LDAP based directory service having a directory service data store 74, although non-LDAP based directory services or other types of databases may be used, such as relational databases. Examples of LDAP based directory services include, but are not limited to, Microsoft® Active Directory®, Netscape Directory Server™ and Novell Netware® 6.5. A general description of an exemplary LDAP based directory service is provided in U.S. Pat. No. 5,689,700 to Miller et al., which is incorporated by reference herein in its entirety.

Directory service data store 74 may store directory service entries 75 in a hierarchical or tree logical structure. The directory service entries 75 may comprise information describing one or more security principals in the network 94 that may be managed by domain controller 60, although the entries 75 may describe other security principals from other networks. Directory service agent 72 may expose one or more application program interfaces to clients, such as server applications 22 in application server 10, for interacting with directory service data store 74 using one or more LDAP calls, although other types of protocols and communication architectures may be used, such as MAPI. The exposed application program interfaces may comprise interfaces that enable clients to bind, logon, search, read, import, export, index, replicate, backup and/or restore one or more directory service entries 75 in directory service data store 74, although a fewer or greater number of interfaces and other types of interfaces may be used.

Local system authority 76 may comprise a protected subsystem that may manage a network operating system ("NOS") for network 94 and may implement the Kerberos V5 authentication protocol to carry out the security policies for network 94, including policies for authenticating clients attempting to access directory service agent 72, although the local security authority 76 may perform other security functions for other resources in network 94, other domains within network 94 or other networks. Further, local system authority 76 may manage a logon process for clients attempting to access network 94.

Credential distribution service 78 may comprise a credential issuing service, such as a key distribution center ("KDC") that generates one or more authentication credentials, such as Kerberos v5 logon session tokens, although other credential issuing services that may generate other types of authentication credentials may be used, such as an NTLM credential issuing service.

Security accounts manager 79 may comprise a database that may store hashed passwords for one or more users in network 94, although the security accounts manager 79 may store other information, hashing techniques do not have to be used, the passwords may be stored elsewhere, and other types of databases may be used, such as directory services.

Figure 8:
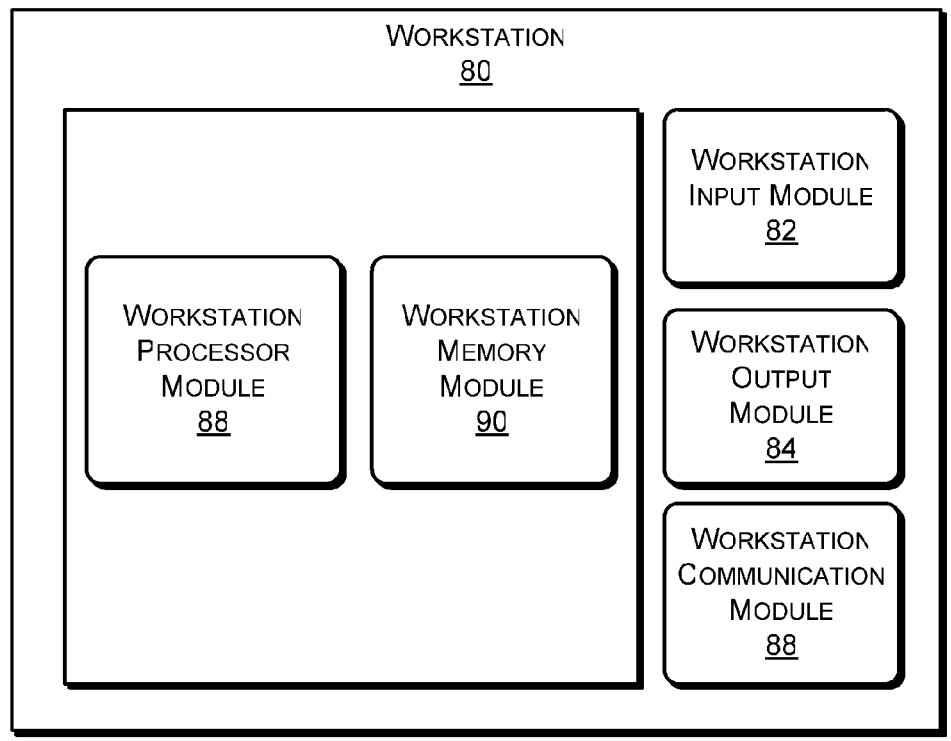
FIGS. 8-9 are diagrams of a client computing resource that may be used to request access to the application server computing resource illustrated in FIGS. 2-3.
Figure 9:
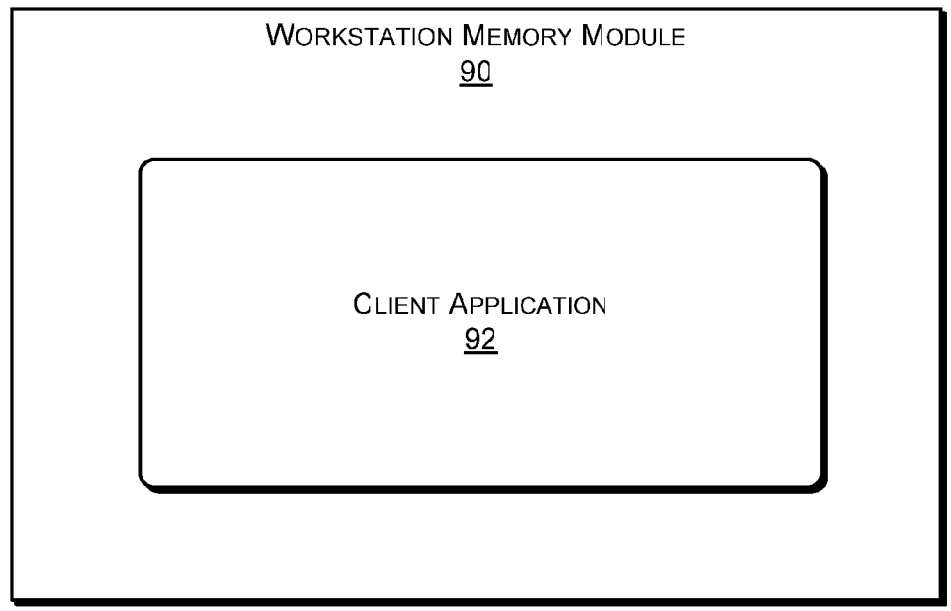

Referring generally to FIGS. 8-9, in its most basic configuration, workstation 80 may comprise workstation input module 82, workstation output module 84, workstation communication module 86, workstation processor module 88 and workstation memory module 90, which may be coupled together by one or more bus systems or other communication links, although workstation 80 may comprise other modules in other arrangements.

Referring specifically to FIG. 8, modules 82, 84, 86, 88 and 90 may be identical to modules 12, 14, 16, 18 and 20 described above in connection with application server 10 shown in FIG. 2, except the modules 82-90 may perform functions for workstation 80 as discussed herein. For instance, workstation processor module 88 may access, interpret and execute instructions and other data stored in workstation memory module 90 to enable workstation 80 to operate modules 82-90 and implement at least a portion of the methods 100, 200 illustrated in FIGS. 10 and 12, respectively, and described further herein below.

Referring specifically to FIG. 9, workstation memory module 90 may also store at least one client application 92. Client application 92 may comprise an LDAP-enabled software application configured to operate in the manner described herein, which may generate and make one or more LDAP calls to one or more LDAP based directory services, such as application directory service agent 26 in server application 22, although client application 92 may make one or more calls to other directory services besides application directory service agent 26 and client application 92 may make other types of calls besides LDAP calls for accessing other types of directory services or databases.

Client application 92 may make one or more bind calls, such as simple LDAP bind calls, although application 92 may make one or or more other more other calls for binding, searching, reading, writing, deleting and/or modifying data maintained in a directory service's data store, such as proxy-user objects 42 or bindable-user objects 44 in directory trees 30(1)-30(2) shown in FIGS. 4 and 5, respectively. Further, client application 92 may be configured to provide one or more appropriate arguments in the one or more LDAP calls that may be made to server application 22 via the server's API's 24.

Referring back to FIG. 1, network 94 may comprise a TCP/IP based local area network ("LAN"), although a variety of other communication systems and/or methods using appropriate protocols may be used, including WANs, wireless networks, phone lines, serial and/or parallel bus cables, coaxial cables, and combinations thereof.

Referring now to FIG. 10, an example of a method 100 related to computing resource access control will now be described in the context of being carried out by system 8 described above in connection with FIGS. 1-9, although one or more other systems could carry out method 100 or portions thereof. Beginning method 100 at step 110, by way of example only, a user of workstation 80 may use the workstation's input module 82, in conjunction with operation of the workstation output module 84, communication module 86, processor module 88 and memory module 90, to operate client application 92 for requesting access to server application 22 implemented on application server 10 shown in FIG. 3.

The user of workstation 80 may desire accessing data maintained in application directory service data store 28 of server application 22, such as data organized into first directory tree 30(1). For instance, client application 92 may represent an employee information browser interface application that may enable one or more users of workstation 80, such as an organization's employees, to request employee related information maintained in first directory tree 30(1), although client application 92 may represent other types of applications, such as e-mail interface applications.

Client application 92 may request the user of workstation 80 to provide information that application 92 may use to request access to server application 22 on the user's behalf responsive to the user initially requesting access to server application 22, although client application 92 may request the user's information from one or more other resources in network 94, application 92 may request the information from one or more other resources requesting access to server application 22, and client application 92 may request the information responsive to other events.

In particular, client application 92 may request the user to provide authentication information, such as a username and a password, although a fewer or greater amount of authentication information and other information may be requested. The user of workstation 80 may provide a username identifying a security principal that is managed by server application 22 for which server application 22 may or may not maintain locally trusted credentials that it could use for authentication. Further, the identified security principal managed by server application 22 may also be managed by domain controller 60, which may also maintain globally trusted credentials that controller 60 may use for authentication. The user may also provide a password that the user purports to be valid for the security principal identified by the provided username, which may be authenticated by at least one of either server application 22 using locally trusted credentials, if available, or domain controller 60 using globally trusted credentials, if available.

In any event, client application 92 may take the purported authentication information provided by the user and request access to server application 22 on the user's behalf. Client application 92 may provide the user's authentication information along with its request to access server application 22, although application 92 may provide the authentication information at other times. Specifically, client application 92 may request accessing application directory service agent 26 in server application 22 via an established LDAP session, although access may be request via other types of sessions. Client application 92 may attempt accessing application directory service agent 26 via a secure channel over network 94 using the transport layer security ("TLS") protocol, although insecure channels and other protocols may be used to form secure channels, such as the secure sockets layer ("SSL") protocol.

To establish an LDAP session with server application 22, client application 92 may make one or more LDAP calls to application directory service agent 26 via APIs 24, such as "ldap_init" and "ldap_connect" calls, including one or more arguments in the calls for identifying application directory service agent 26 and for providing other information. Responsive to these one or more LDAP calls, application directory service agent 26 may establish the LDAP session and provide client application 92 with a "session_handle" value that it may use to identify the established session, although the LDAP session may be established in other ways. An LDAP session may comprise an opaque data type representing a connection between client application 92 and one or more server applications 22 or other resources in network 94.

Client application 92 may request access to application directory service agent 26 via the established LDAP session by making one or more LDAP bind calls to application directory service agent 26, although access may be requested in other ways. For instance, client application 92 may make one or more simple LDAP bind calls passing in the established session reference and the user's purported authentication information as one or more arguments, such as "ldap_simple_bind_s(session_handle, username, password)," although other arguments may be passed in the LDAP bind call and other types of synchronous or asynchrounous LDAP bind calls may be made.

The arguments that may be provided in the bind call will now be described. The "session_handle" argument may comprise a pointer to the established LDAP session. The "username" argument may comprise a portion of the purported authentication information provided by the user as discussed above earlier, such as a username that identifies a security principal managed by at least one of server application 22 or domain controller 60, which may correspond to a DN of one of the proxy-user objects 42 or bindable user objects 44 organized within first directory tree 30(1) in application directory service agent 26 at server application 22, for example, where tree 30(1) is implemented in an LDAP directory service. As mentioned above earlier, a DN is a distinguished name that may be used to uniquely identify entries in first directory tree 30(1). The "password" argument may comprise another portion of the purported authentication information provided by the user, such as a password purported to be valid for the security principal identified by the provided username.

At step 120, application directory service agent 26 in server application 22 may perform server access control responsive to the LDAP bind call made by client application 92 at step 110, such as method 200 described further herein below and illustrated in FIG. 12. Generally, however, server access control may involve application directory service agent 26 verifying at least a portion of the purported authentication information (e.g., password) using locally trusted credentials maintained by server application 22, although directory service agent 26 may request domain controller 60 to verify the portion of the purported authentication information.

In either case, application directory service agent 26 may return a value to client application 92 indicating an unsuccessful authentication if the purported authentication information cannot be verified. On the other hand, application directory service agent 26 may return a value to client application 92 indicating a successful authentication if the purported authentication information is verified. Application directory service agent 26 may also generate a local access token for server application 22 that may be associated with an authenticated user for which the portion of the purported authentication information may be successfully authenticated, which may include one or more user security identifiers ("SIDs") or group SIDS that the user may be associated with. Further, application directory service agent 26 may use the local access token to perform one or more security access checks responsive to client application 92 requesting access to server application 22 on the user's behalf as described in further detail herein below in connection with step 140.

At step 130, if the user of workstation 80 is unsuccessfully authenticated at step 120, then the NO branch may be followed to end the method 100, although the method 100 or portions thereof may be repeated. Otherwise, the YES branch may be followed to step 140 if the user of workstation 80 is successfully authenticated at step 120.

At step 140, client application 92 may make one or more LDAP operation calls on application directory service agent 26 resposive to one or more requests made by the authenticated user of workstation 80 for accessing application directory service agent 26. In particular, client application 92 may include the value of the session_handle argument for the established LDAP session, along with one or more arguments related to the particular requested operation, in one or more LDAP operation calls on directory service agent 26, such as an LDAP search call, although other arguments may be provided and other calls may be made. Application directory service agent 26 may examine the one or more LDAP calls to determine whether the authenticated user on whose behalf the one or more calls may be made may be authorized to perform the one or more requested operations.

In particular, application directory service agent 26 may examine the local access token generated for an authenticated user to obtain the one or more SIDs and/or group SIDs identified in the token, which may be obtained in the manner described further herein below in connection with method 200, step 260, illustrated in FIG. 12, for example. Application directory service agent 26 may then consult one or more access control lists ("ACLs") maintained by server application 22 in application server memory module 20 to determine whether one or more of the security principals in network 94 corresponding to the user SIDs or group SIDs from the local access token may have permission to perform the requested operation, although the ACLs may be maintained by another device or system. Generally, the ACLs may define access permissions, such as what operations may be performed by particular security principals in network 94, such as proxy-user objects 42, bindable-user objects 44 and group objects 45, although one or more attributes of the entries in tree 30(1) may be used to define access permissions for security principals and ACLs may be defined in other ways. In particular, the ACLs may include one or more access control entries ("ACEs") that may identify one or more operations and one or more permissions associated with those operations, such as allowing or denying the operations, although the ACLs may include other information.

Application directory service agent 26 may determine whether an authenticated user may have suffient permission for implementing the requested operation by evaluating the appropriate ACEs in one or more ACLs corresponding to the security principals in network 94 (e.g., proxy-user objects 42, bindable-user objects 44 and group objects 45) identified via the user SIDs or group SIDs obtained from the local access token, although the user's permissions for the requested operation may be determined in other ways. Application directory service agent 26 may evaluate the ACEs from one or more of the corresponding ACLs until agent 26 identifies an ACE that provides an authenticated user with suffient permissions for implementing the requested operation.

If a corresponding ACL with an ACE that provides an authenticated user with sufficient permissions for implementing the requested operation is identified, then application directory service agent 26 may access first directory tree 30(1) to perform the operation requested by the authenticated user. Further, application directory service agent 26 may return the results of the operation to client application 92, and the operation's results may be presented to the authenticated user of workstation 80. If application directory service agent 26 is unable to identify any ACEs in the one or more corresponding ACLs providing sufficient permission for implementing the operation requested by the authenticated user, however, then directory service agent 26 may return an error message to client application 92 in workstation 80. Additionally, steps 110-140 in method 100 for controlling server access may be implemented using second directory tree 30(2) illustrated in FIG. 5 in the same manner described above.

Referring now to FIGS. 11-12, another example related to computing resource access control, which may be used in connection with method 100 illustrated in FIG. 10 that may also be related to computing resource access control, will now be described with reference to method 200 shown in FIG. 12 in the context of being carried out by system 8 described above in connection with FIGS. 1-9, although one or more other systems could carry out method 200 or portions thereof, and method 200 may be used in connection with other methods related to computing resource access control besides method 100.

Beginning method 200 at step 210, by way of example only, application directory service agent 26 in server application 22 may attempt to verify a portion of purported authentication information, such as a password, which may have been provided by a resource in network 94 in connection with a request to access server application 22 (e.g., simple LDAP bind request) as described above in connection with step 110 in method 100. Server application 22 may begin by obtaining information from application directory service data store 28 that may describe a security principal identified by another portion of the purported authentication information, such as a username, provided in connection with the request to access server application 22 at step 110.

For instance, application directory service agent 26 in server application 22 may identify an entry in first directory tree 30(1), shown in FIG. 4, under security principals container 40 with a DN matching a portion of the purported authentication information, such as the username, provided in connection with the above-referenced access request, although other entries under one or more other containers in tree 30(1) may be identified. When an entry with a matching DN is identified (hereinafter referred to as a "matching user entry" and variations thereof), application directory service agent 26 may obtain information from the matching user entry for further processing as described below in connection with step 220. If no matching user entry is found, however, application directory service agent 26 may return an error message to client application 92, which may cause method 200 to end, although one or more portions of method 200 may be repeated.

At step 220, application directory service agent 26 may determine whether a matching user entry represents a proxy user or a bindable user in network 94, although other types of users may be determined. The determination of which type of user the matching user entry represents may be made so that application directory service agent 26 may perform a portion of method 200 related to verifying purported authentication information that is appropriate for each type of user. Generally, however, application directory service agent 26 may not have access to one or more locally trusted credentials for authenticating proxy users while agent 26 may have access to locally trusted credentials for authenticating bindable users, for example.

If application directory service agent 26 determines that a matching user entry corresponds to a bindable user represented by one of the bindable-user objects 44 in first directory tree 30(1), then the NO branch may be followed and the portion of the purported authentication information (e.g., password) may be authenticated for the bindable user identified by the other portion of the purported authentication information (e.g., username) in the manner described in connection with step 270, for example. Otherwise, the YES branch may be followed and the portion of the purported authentication information (e.g., password) may be authenticated for the proxy user identified by the other portion of the purported authentication information (e.g., username) in the manner described in connection with step 230, for example.

Furthermore, a number of methods may be employed to determine whether a matching user entry represents a proxy user or a bindable user. For instance, application directory service agent 26 may determine whether the matching user entry represents a proxy user or a bindable user in network 94 based on one or more auxiliary schema classes that may be associated with the matching user entry (hereinafter referred to as a "matching user entry's auxiliary schema class" and variations thereof). To identify a matching user entry's auxiliary schema class, application directory service agent 26 may first determine which one or more structural schema classes upon which the matching user entry may represent an instance of (hereinafter referred to as a "matching user entry's structural schema class" and variations thereof), although the entry's auxiliary schema class may be identified in other ways.

Application directory service agent 26 may identify a matching user entry's structural schema class by identifying one or more "objectClass" attribute values that may be present in a matching user entry, although an entry's structural schema classes may be identified in other ways. Once the matching entry's "objectClass" attribute values are identified, application directory service agent 26 may identify one or more class objects 34-38 under schema container 32 in first directory tree 30(1) shown in FIG. 4 with a DN matching the identified "objectClass" attribute values, although the entry's structural schema entries may be identified in other ways. In this example, application directory service agent 26 may identify proxy-user class object 34 or bindable-user class object 36 in first directory tree 30(1) as representing the matching user entry's structural schema class. Having identified the matching user entry's structural schema class, application directory service agent 26 may now identify the entry's auxiliary schema classes, although the entry's auxiliary schema classes may be identified at other times or in response to other events.

Identifying the matching user entry's auxiliary schema classes may involve application directory service agent 26 identifying one or more "systemAuxiliaryClass" attribute values that may be present in the matching user entry's structural schema class, although the entry's auxiliary schema classes may be identified in other ways. In this example, the "systemAuxiliaryClass" attribute values may identify auxiliary proxy-user class object 34A or auxiliary bindable-user class object 36A as being a matching user entry's auxiliary schema class. Further in this example, if a matching user entry's auxiliary schema class is identified as being auxiliary proxy-user class object 34A, then the matching user entry may represent a proxy user. Conversely, if a matching user entry's auxiliary schema class is identified as being auxiliary bindable-user class object 36A, then the matching user entry may represent a bindable user. Having described an example of a method that may be employed to determine whether a matching user entry represents a proxy user or a bindable user, the description of method 200 will now continue at step 230.

At step 230, responsive to a determination at step 220 of a matching user entry representing a proxy user that may be described by one of the proxy-user objects 42 in first directory tree 30(1), application directory service agent 26 may request domain controller 60 to authenticate a portion of the purported authentication information provided for the proxy user (e.g., password), although agent 26 may request authentication at other times or in response to other events. Before application directory service agent 26 may request domain controller 60 to authenticate the purported authentication information, however, agent 26 may obtain an account identifier that may be used by domain controller 60 to identify a security principal that may correspond to the proxy user.

Application directory service agent 26 may use information maintained in proxy-user objects 42 to obtain the account identifier, although the account identifier may be maintained directly in proxy-user object 42. For example, application directory service agent 26 may obtain an "objectSID" attribute value from proxy-user object 42 that may represent a security identifier ("SID") used by domain controller 60 to identify security principals. Further, the SID expressed in this example by the "objectSID" attribute value in proxy-user object 42 may link the proxy user that may be represented by object 42 with the corresponding security principal managed by domain controller 60.

Having obtained a proxy user's SID, application directory service agent 26 may call one or more functions on directory service agent 72 via one or more application program interfaces exposed by domain controller 60 to request the account identifier for the security principal in exchange for the SID. At least one utility may be realized by maintaining information in proxy-user objects 42 that may be used to obtain account identifiers instead of maintaining the account identifiers directly in objects 42. For instance, in some network environments, the account identifiers that may be used by a trusted authority, such as domain controller 60 for example, may be more likely to change whereas the SIDs may be less likely to change in comparison.

In a Microsoft® Active Directory® directory service environment, for example, application directory service agent 26 may call a "lookupSID(inputSID, outputUsername)" function to obtain an account identifier in exchange for a SID, although other functions with other arguments may be called where other types of directory services or other services are used. The "lookupSID" function in this specific example may return an account identifier in the form of a NOS logon username via the "outputUsername" argument that identifies the corresponding account for the security principal that is managed by domain controller 60. Moreover, the returned NOS logon username may correspond to the "objectSID" attribute value (e.g., SID) from proxy-user object 42 that may be provided via the "inputSID" argument. Additionally, the "lookupSID" function call may take one or more other arguments as well, such as a "policyHandle" argument that may comprise a handle to a policy object that specifies an appropriate access right that application directory service agent 26 may need to have to make the function call, a "Count" argument that may comprise an integer value representing a total number of different SIDs expressed using the "inputSID" argument where a NOS logon username may be requested for more than one "objectSID" attribute value, and a "referencedDomains" argument that may comprise a pointer to an array having one or more entries identifying one or more domains that may be present in network 94 where the "objectSID" attribute value expressed using the "inputSID" argument may be found, although other arguments may be used for different functions implemented by other types of directory services or authentication services.

Continuing with this specific example of a Microsoft® Active Directory® directory service environment, directory service agent 72 in domain controller 60 may process the "lookupSID" function call by requesting local system authority 76 to return an account identifier (e.g., NOS logon username) corresponding to the "objectSID" attribute value (e.g., SID) provided via the "inputSID" argument in the function call. In turn, local system authority 76 may access security accounts manager 79 to obtain the corresponding account identifier. Further, local system authority 76 may either return the corresponding account identifier or may return an error value to application directory service agent 26 if no corresponding account identifier is found.

Once application directory service agent 26 obtains the account identifier from domain controller 60, agent 26 may request directory service agent 72 in domain controller 60 to authenticate a portion of the purported authentication information (e.g., password) that may have been provided to agent 26 in connection with a request to access server application 22 at step 110 in method 100, for example, although agent 26 may request authentication at other times or in response to other events, and agent 26 may request other resources in network 94 or other authentication services to authenticate the purported authentication information. In particular, application directory service agent 26 may call one or more functions on directory service agent 72 in domain controller 60 via one or more of the controller's exposed application program interfaces, although any function on any other system or service may be called.

Still continuing with the specific example of the Microsoft® Active Directory® directory service environment, application directory service agent 26 may call a "logonUser(inputUsername, inputPassword, tokenHandle)" function exposed by domain controller 60, for example, although other functions with other arguments may be called where other types of directory services or authentication services using other protocols may be used. The "inputUsername" argument may accept a pointer to a string that holds the account identifier (e.g., NOS logon username) obtained by application directory service agent 26 as described above, which may correspond to an account for a security principal managed by domain controller 60 and represented by one or more directory service entries 75 of directory service data store 74 in directory service agent 72, for example.

The "inputPassword" argument may accept a pointer to a string that holds a portion of the purported authentication information (e.g., password) provided in connection with the request to access server application 22 at step 110 in method 100, for example, which application directory service agent 26 may desire authenticating. The "tokenHandle" argument may return a pointer to a proxy user's logon session token 95 that may be generated if the portion of the purported authentication information is successfully authenticated. Logon session token 95 may be used to impersonate a security principal managed by domain controller 60 that is identified by the account identifier accepted via the "inputUsername" argument, although the logon session token 95 may be used for other purposes, such as for creating one or more processes that run in the context of the associated security principal.

The "logonUser" function call may take one or more other arguments as well, such as a "userDomain" argument, "logonType" argument and "logonProvider" argument, although other arguments may be used for different functions implemented by other types of directory services or logon/authentication services. The "userDomain" argument may be used where the account identifier (e.g., NOS logon username) provided in the "inputUsername" argument may not identify a domain or server having an account database that may store the security principal's account information. Thus, the "userDomain" argument may accept a pointer to a string that holds the name of a domain or server that may store the security principal's account information. The "logonType" argument may comprise one or more values indicating any particular types of logon operations to perform during authentication. The "logonProvider" argument may comprise one or more values for indicating a default logon service provider, such as an NTLM service, which may be used when the "inputUsername" or "userDomain" arguments may not identify a domain or server (e.g., domain controller 60) that may store the security principal's account information.

In any event, directory service agent 72 in domain controller 60 may process the "logonuser" function call in this specific example by requesting local system authority 76 to authenticate the portion of the purported authentication information (e.g., password) corresponding to the account identifier (e.g., NOS logon username) provided via the "inputUsername" and "inputPassword" arguments, respectively. Local system authority 76 may access security accounts manager 79 to authenticate the portion of the purported authentication information. If the authentication is successful, local system authority 76 may request credential distribution service 78 to generate logon session token 95, which may represent a Kerbos v5 logon session token, although other types of tokens may be generated. Further, local system authority 76 may report the successful authentication result to application directory service agent 26. If the authentication is unsuccessful, local system authority 76 may report the unsuccessful authentication result to application directory service agent 26.

Generally, logon session token 95 may comprise a data structure that may include information describing the security context under which an authenticated security principal may access resources in network 94. Application directory service agent 26 may access logon session token 95 via the "tokenHandle" argument associated with the "logonuser" function described above, for example. More specifically, the logon session token 95 may include a user SID identifying a security principal's account that is managed by domain controller 60 and corresponds to the proxy user. Logon session token may also include one or more group SIDs that may identify one or more security groups of which the security principal may be associated, although the token 95 may include other information.

At step 240, if directory service agent 72 does not successfully authenticate the portion of the purported authentication information provided for the proxy user, such as if an incorrect password was provided at step 110 in method 100 in connection with the request to access server application 22, for example, then the NO branch may be followed to end the method 200, although the method 200 or portions thereof may be repeated. Otherwise, the YES branch may be followed to step 240 if directory service agent 72 successfully authenticates the portion of the purported authentication information.

At step 250, application directory service agent 26 may generate local access token 96A by extracting one or more portions of information from logon session token 95 obtained from domain controller 60 as described earlier in connection with step 230. Generally, local access token 96A may comprise the same information included in logon session token 95, except token 96A may also include information that may be particular for server application 22 as explained further in connection with step 260 below. Application directory service agent 26 may store local access token 96A in application server memory module 20 for further processing as described herein, although token 96A may be stored elsewhere.

At step 260, application directory service agent 26 may augment local access token 96A generated at step 250 to include additional information maintained by server application 22 in application directory service data store 28 for the proxy user, such one or more additional SIDs (e.g., user SIDs or group SIDs) that may be different from one or more of the SIDs identified in logon session token 95 obtained from domain controller 60 at step 230. In particular, application directory service agent 26 may identify one or more entries in first directory tree 30(1), such as proxy-user objects 42, bindable-user objects 44 or group objects 45, which may have one or more "ObjectSID" attribute values matching the SIDs identified in logon session token 95, although other entries in tree 30(1) may be identified. Application directory service agent 26 may then obtain the "dn" attribute value from each of those matching entries and identify one or more "member" attribute values in one or more group objects 45 in first domain tree 30(1) that may identify the DN of the matching entries.

Application directory service agent 26 may then obtain the "ObjectSID" attribute values, such as one or more SIDs from one or more of the identified group objects 45, and agent 26 may augment local access token 96A to include the obtained SIDs. Further, application directory service agent 26 may repeat the process described above for identifying one or more other "member" attribute values in other group objects 45 that may reference at least one of either the identified group objects 45 or members of the identified group objects 45, for example, and may augment local access token 96A by including the "ObjectSID" attribute values (e.g., SIDs) from those other identified group objects 45.

At step 270, responsive to a determination at step 220 of a matching user entry representing a bindable user corresponding to a bindable-user object 44 in first directory tree 30(1) shown in FIG. 4, application directory service agent 26 may authenticate the portion of the purported authentication information (e.g., password) that may have been provided at step 110 in method 100 in connection with a request to access server application 22, for example, using locally trusted credentials maintained by application directory service agent 26.

In some network environments, domain controller 60 may not maintain any globally trusted credentials for particular security principals that may request access to server application 22. Consequently, server application 22 may not be able to leverage globally trusted credentials for validating purported authentication information (e.g., passwords) provided by those particular security principals. However, server application 22 may be configured to maintain locally trusted credentials that may be used to verify those particular security principals' purported authentication information. For example, application directory service agent 26 may compare the locally trusted authentication credentials held in a "unicodePwd" attribute value in bindable-user object 44 with the portion of the purported authentication information (e.g., password) to authenticate the information.

At step 280, if application directory service agent 26 does not successfully authenticate the portion of the purported authentication information provided for the bindable user, such as if an incorrect password was provided at step 110 in method 100 in connection with a request to access server application 22, then the NO branch may be followed to end the method 200, although the method 200 or portions therof may be repeated. Otherwise, the YES branch may be followed to step 290 if application directory service agent 26 successfully authenticates the portion of the purported authentication information.

At step 290, application directory service agent 26 may generate local access token 96B. Generally, local access token 96B may comprise the same types of information as local access token 96A described above in connection with step 250. In particular, local access token 96B may include one or more SIDs that may identify a security principal managed by server application directory service agent 26 and/or one or more additional group SIDs that may identify one or more security groups of which the security principal may be associated with, although token 96B may include other information. Application directory service agent 26 may determine which one or more other groups the bindable user may be associated with in the same manner described above in connection with step 260, except application directory service agent 26 may initially identify one or more "member" attribute values in group objects 45 that may reference the DN of bindable-user object 44 corresponding to the bindable user, although other groups may be identified in other ways. Application directory service agent 26 may include one or more identified SIDs in local access token 96B. Further, application directory service agent 26 may store local access token 96B in application server memory module 20 for further processing, although method 200 may end.

It should be noted that steps 210-290 in method 200 for performing one or more authentication processes may be implemented using second directory tree 30(2) illustrated in FIG. 5 in the same manner described above with respect to first directory tree 30(1), except at step 220, application directory service agent 26 may determine whether the matching user entry represents a proxy user or a bindable user by identifying which one or more structural schema classes may have been instantiated to generate the matching user entry, such as proxy-user class object 34' or bindable-user class object 36', without determining which one or more auxiliary schema classes may be associated with the matching user entry. For example, application directory service agent 26 in server application 22 may obtain the matching user entry's "objectClass" attribute value and may identify proxy users or bindable users based on that obtained attribute value.

It should be appreciated that while application server memory module 20, domain controller memory module 70 and workstation memory module 90 illustrated in FIGS. 2, 6 and 8, respectively, have been described above as comprising computer storage media, the memory modules 20, 70 and 90 should be broadly interpreted to cover communication media as well. Communication media may embody computer-readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example only, communication media includes wired media, such as a wired network or direct-wired connection, and wireless media, such as acoustic, RF, infrared, other wireless media, and combinations thereof.

Additional Schema Definitions

As mentioned above earlier, pseudo-code examples of additional schema represented by supporting schema objects 38 in directory trees 30(1) and 30(2) illustrated in FIGS. 4 and 5, respectively, which may support one or more of the schema examples provided above earlier in Tables 1-7, are included herein below to facilitate the reader's understanding of the provided examples. However, it should be appreciated that the following schema examples may not represent an exhaustive compilation and that other schema may be used. Furthermore, system 8 and methods 100, 200 may be implemented without undue experimentation even if the following schema examples were omitted.

In any event, an example of a "Top" class and a "classSchema" class, which may be referred to by one or more of the schema examples provided above earlier in Tables 1-7, is included further herein below. Generally, the "Top" and "classSchema" classes may comprise abstract and structural schema classes, respectively, from which one or more schema classes defined in at least one of either class objects 34, 34A, 34', 34A', 36, 36A, 36', 36A', 37 and 38 in first and second directory trees 30(1) and 30(2) may be derived via inheritance rules. Further, the "Top" and "classSchema" classes may be structured in accordance with RFC's 2252 and 2256 using any number of schema formats, such as ASN.1, BNF, Slapd-.conf, and other formats.

"Top" Class and "classSchema" Class Examples

Pseudo-code examples of schema that may be used to form at least a portion of the "Top" and "classSchema" classes are provided below in Table 8:

TABLE 8

"Top" Class Example dn: cn=Top, cn=schema container 32, cn=configuration container 46,
    dc=root container 54
objectClass: Top
cn: Top
objectClassCategory: 2
systemMustContain: objectCategory
systemMustContain: objectClass
systemMayContain: cn
systemMayContain: objectSid
systemMayContain: unicodePwd
systemMayContain: member
systemMayContain: memberOf
"classSchema" Class Example dn: cn=classSchema, cn=schema container 32, cn=configuration container 46,
    dc=root container 54
objectClass: Top
subClassOf: Top
cn: classSchema
objectCategory: 1
systemMustContain: cn
systemMustContain: subClassof
systemMustContain: objectClassCategory
systemMayContain: systemAuxiliaryClass
systemMayContain: systemMayContain
systemMayContain: systemMustContain While the disclosed technology has been described above, alternatives, modifications, variations, improvements, and substantial equivalents that are or may be presently unforeseen may arise to applicants or others skilled in the art. Accordingly, the appended claims as filed, and as they may be amended, are intended to embrace all such alternatives, modifications, variations, improvements, and substantial equivalents. Further, the recited order of processing elements or sequences, or the use of numbers, letters, or other designations therefor, is not intended to limit the claimed processes to any order except as may be specified in the claims.

What is claimed is:

1. An access control method implemented on a computing system, the method comprising:
identifying at least one resource principal for which an application program lacks at least one local trusted credential for authenticating at least one purported client credential provided in connection with at least one local access request on a first computer on which the application program is executing; and
authorizing at least one client to access the application program based on a determination by at least one separate non-local trusted authority, executing on a second computer different from the first computer, that the at least one purported client credential is valid for the at least one resource principal, and
providing access to the application program based on the determination by the at least one separate non-local authority,
wherein the application program maintains locally trusted credentials for authenticating client credentials provided for local access requests.

2. The method as set forth in claim 1 further comprising:
obtaining at least one reference to at least one security identifier for the at least one resource principle via at least one application object managed by the application program; and
requesting the at least one separate trusted authority to provide at least one account identifier for the at least one resource principle in exchange for the at least one security identifier obtained via the at least one application object.

3. The method as set forth in claim 1 further comprising:
identifying at least one other resource principal for which the application program maintains at least one locally trusted credential for authenticating at least one other purported client credential provided in connection with at least one other access request; and
authorizing at least one other client to access the application program based on another determination by the at least one application program that the at least one other purported client credential is valid for at least one other resource principal.

4. The method as set forth in claim 3 further comprising:
authenticating the at least one other purported client credential provided in connection with the at least one other access request based on the at least one locally trusted credential maintained by the application program without involving the at least one non-local separate trusted authority.

5. At least one computer-readable storage medium having at least one instruction stored thereon, which when executed by at least one processing system in conjunction with at least one application program, causes the at least one application program to implement at least one access control method, the at least one medium comprising at least one instruction for:
identifying at least one resource principal for which the at least one application program lacks at least one local trusted credential for authenticating at least one purported client credential provided in connection with at least one local access request on a first computing system on which the application program is executing;

authorizing at least one client to access the at least one application program based on a determination by at least one separate non-local trusted authority, executing on a second computing system different from the first computing system, that the at least one purported client credential is valid for the at least one resource principal, and providing access to the at least one application program based on the authorizing of the at least one client to access the at least one application program, wherein the application program maintains locally trusted credentials for authenticating client credentials provided for local access requests.

6. The at least one medium as set forth in claim 5 further comprising at least one other instruction for:

obtaining at least one reference to at least one security identifier for the at least one resource principle via at least one application object managed by the at least one application program; and requesting the at least one separate trusted authority to provide at least one account identifier for the at least one resource principle in exchange for the at least one security identifier obtained via the at least one application object.

7. The at least one medium as set forth in claim 5 further comprising at least one other instruction for:

identifying at least one other resource principal for which the at least one application program maintains at least one locally trusted credential for authenticating at least one other purported client credential provided in connection with at least one other access request; and authorizing at least one other client to access the at least one application program based on another determination by the at least one application program that the at least one other purported client credential is valid for at least one other resource principal.

8. The at least one medium as set forth in claim 5 wherein the at least one application program comprises at least one of either one or more directory services, one or more databases, or one or more of any other type of data store.

9. A computer readable storage medium having at least one application program interface (API) tangibly embodied as at least one instruction stored on the computer-readable storage medium, which when executed by at least one processing system in conjunction with at least one application program, causes the at least one application program to implement at least one access control method, the at least one API comprising:

at least one access interface that accepts at least one request to access the at least one application program; and at least one credential parameter that accepts at least one purported client credential provided in connection with at least one call to the at least one access interface for which the at least one application program lacks at least one local trusted credential for authenticating, on a first computing system on which the application program is executing, and for which the at least one application program requests at least one separate non-local trusted authority to authenticate on a second computing system different from the first computing system, wherein the at least one interface grants access to the at least one application program on a determination based the at least one credential credential parameter, and wherein the at least one application program maintains locally trusted credentials for authenticating client credentials for access requests.

10. The medium as set forth in claim 9 further comprising at least one identifier parameter for the at least one access interface that accepts at least one identifier that identifies at least one application object of the at least one application program which references at least one resource principle managed by the separate trusted authority for which authentication of the at least one purported client credential is based on.

11. The medium as set forth in claim 10 wherein the at least one identifier parameter accepts at least one other identifier that identifies at least one other application object maintaining at least one locally trusted credential which the at least one application program can use to authenticate at least one other purported client credential accepted by the at least one credential parameter without involving the at least one separate trusted authority.

12. The medium as set forth in claim 9 wherein the at least one access interface returns at least one authentication result obtained by the at least one application program performing at least one of either requesting the at least one separate trusted authority to authenticate the at least one purported client credential or authenticating at least one other purported client credential accepted by the at least one credential parameter using at least one locally trusted credential maintained by at least one application object of the at least one application program.

13. The medium as set forth in claim 9 wherein the at least one access interface is expressed using at least one of either a lightweight directory access protocol or one or more of any other protocol.

14. The medium as set forth in claim 9 wherein the at least one application program comprises at least one of either one or more directory services, one or more databases, or one or more of any other type of data store.

15. A computer implemented method of requesting access to at least one application program on an application server, the method comprising:

calling at least one access interface that has at least one credential parameter for requesting access to the at least one application program executing on a first computing system; and providing the at least one credential parameter with at least one purported client credential for which the at least one application program lacks at least one local trusted credential for authenticating and for which the at least one application program requests at least one separate non-local trusted authority to authenticate on a second computing system different from the first computing system, wherein the at least one application program maintains locally trusted credentials for authenticating client credentials for access requests; and accessing the application program on a determination based on the at least one credential parameter.

16. The method as set forth in claim 15 wherein the at least one access interface also has at least one identifier parameter, the method further comprising:

providing the at least one identifier parameter with at least one identifier that identifies at least one application object of the at least one application program which references at least one resource principle managed by the separate trusted authority for which authentication of the at least one purported client credential is based on.

17. The method as set forth in claim 16 further comprising:

providing the at least one identifier parameter with at least one other identifier that identifies at least one other application object maintaining at least one locally trusted credential which the at least one application program can use to authenticate at least one other purported client credential provided to the at least one credential parameter without involving the at least one separate trusted authority.

18. The method as set forth in claim 15 wherein calling at least one access interface further comprises:

making at least one lightweight directory access protocol simple bind call or one or more other calls using any other protocol in connection with the at least one access interface call.

19. The method as set forth in claim 15 further comprising:
obtaining at least one return value indicating successful or unsuccessful authentication of the at least one purported client credential.

20. The method as set forth in claim 15 further comprising:
accessing the at least one application program responsive to obtaining at least one return value indicating successful authentication of the purported credential information.

* * * * *